(12) United States Patent
Katoh et al.

(10) Patent No.: US 9,141,010 B2
(45) Date of Patent: Sep. 22, 2015

(54) PARTICULATE MATERIAL PRODUCTION APPARATUS, AND PARTICULATE MATERIAL PRODUCTION METHOD

(71) Applicants: Kiyotada Katoh, Shizuoka (JP); Yoshihiro Norikane, Kanagawa (JP); Yasutada Shitara, Shizuoka (JP); Shinji Aoki, Shizuoka (JP); Minoru Masuda, Shizuoka (JP); Satoshi Takahashi, Kanagawa (JP)

(72) Inventors: Kiyotada Katoh, Shizuoka (JP); Yoshihiro Norikane, Kanagawa (JP); Yasutada Shitara, Shizuoka (JP); Shinji Aoki, Shizuoka (JP); Minoru Masuda, Shizuoka (JP); Satoshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/916,892

(22) Filed: Jun. 13, 2013

(65) Prior Publication Data

US 2014/0038100 A1    Feb. 6, 2014

(30) Foreign Application Priority Data

Jul. 31, 2012 (JP) ................... 2012-169751
Feb. 14, 2013 (JP) ................... 2013-026466

(51) Int. Cl.
    *C04B 35/468*    (2006.01)
    *C08K 3/10*    (2006.01)
    *G03G 9/08*    (2006.01)
    (Continued)

(52) U.S. Cl.
    CPC ............ *G03G 9/0802* (2013.01); *B01J 2/04* (2013.01); *B01J 2/18* (2013.01)

(58) Field of Classification Search
    CPC ............ G03G 9/0802; B01J 2/04; B01J 2/18
    USPC .............................. 425/6–8; 264/8–9, 12–14
    See application file for complete search history.

(56) References Cited

U.S. PATENT DOCUMENTS

| | | | | |
|---|---|---|---|---|
| 2,779,623 | A | * | 1/1957 | Eisenkraft ................. 239/4 |
| 3,630,509 | A | * | 12/1971 | Davies et al. .............. 425/7 |
| 3,655,837 | A | * | 4/1972 | Reed et al. ................ 264/14 |

(Continued)

FOREIGN PATENT DOCUMENTS

| | | |
|---|---|---|
| CN | 101308338 A | 11/2008 |
| CN | 101308339 A | 11/2008 |

(Continued)

OTHER PUBLICATIONS

U.S. Appl. No. 13/854,317, filed Apr. 1, 2013, Takahashi, et al.

(Continued)

*Primary Examiner* — Joseph S Del Sole
*Assistant Examiner* — Thukhanh T Nguyen
(74) *Attorney, Agent, or Firm* — Oblon, McClelland, Maier & Neustadt, L.L.P.

(57) ABSTRACT

A particulate material production apparatus is disclosed. The particulate material production apparatus includes a droplet ejector to eject droplets of a particulate material composition liquid or a melted particulate material composition in a droplet ejection direction from nozzles; a solidifying device to solidify the droplets; a first airflow forming device to form a first airflow to feed the ejected droplets to the solidifying device with the first airflow; and a second airflow forming device to form a second airflow to apply the second airflow the droplets before the droplets are fed by the first airflow. The second airflow forming device forms the second airflow by supplying a pressed gas from a slit, and the traveling direction of the first airflow is substantially perpendicular to the droplet ejection direction.

12 Claims, 12 Drawing Sheets

(51) Int. Cl.
*B01J 2/04* (2006.01)
*B01J 2/18* (2006.01)

(56) References Cited

U.S. PATENT DOCUMENTS

| | | | |
|---|---|---|---|
| 5,721,083 A | 2/1998 | Masuda et al. | |
| 6,406,826 B1 | 6/2002 | Suzuki et al. | |
| 7,374,704 B2 * | 5/2008 | Che et al. ................... | 264/13 |
| 2002/0155366 A1 | 10/2002 | Mochizuki et al. | |
| 2002/0160290 A1 | 10/2002 | Sugiura et al. | |
| 2003/0152857 A1 | 8/2003 | Sugiura et al. | |
| 2003/0186154 A1 | 10/2003 | Suzuki et al. | |
| 2003/0232266 A1 | 12/2003 | Sugiura et al. | |
| 2005/0064310 A1 | 3/2005 | Masuda et al. | |
| 2006/0051692 A1 | 3/2006 | Hasegawa et al. | |
| 2006/0063092 A1 | 3/2006 | Hasegawa et al. | |
| 2006/0068306 A1 | 3/2006 | Shu et al. | |
| 2006/0093943 A1 | 5/2006 | Shu et al. | |
| 2007/0275315 A1 | 11/2007 | Nagatomo et al. | |
| 2007/0281236 A1 | 12/2007 | Watanabe et al. | |
| 2007/0281237 A1 | 12/2007 | Iwamoto et al. | |
| 2008/0063971 A1 | 3/2008 | Watanabe et al. | |
| 2008/0096116 A1 | 4/2008 | Utsumi et al. | |
| 2008/0118855 A1 | 5/2008 | Nakayama et al. | |
| 2008/0261131 A1 | 10/2008 | Nakayama et al. | |
| 2008/0286680 A1 | 11/2008 | Norikane et al. | |
| 2009/0117486 A1 | 5/2009 | Watanabe et al. | |
| 2009/0123857 A1 | 5/2009 | Shu et al. | |
| 2009/0170018 A1 | 7/2009 | Kuramoto et al. | |
| 2009/0239170 A1 | 9/2009 | Honda et al. | |
| 2009/0297973 A1 | 12/2009 | Iwamoto et al. | |
| 2009/0325100 A1 | 12/2009 | Watanabe et al. | |
| 2010/0003613 A1 | 1/2010 | Honda et al. | |
| 2010/0021209 A1 | 1/2010 | Watanabe et al. | |
| 2010/0227267 A1 | 9/2010 | Shitara et al. | |
| 2010/0297548 A1 * | 11/2010 | Honda et al. ................ | 430/137.1 |
| 2011/0014565 A1 | 1/2011 | Norikane et al. | |
| 2011/0305987 A1 | 12/2011 | Yohichiroh et al. | |
| 2012/0070777 A1 | 3/2012 | Makabe et al. | |
| 2012/0094231 A1 | 4/2012 | Norikane et al. | |
| 2012/0264049 A1 | 10/2012 | Masuda et al. | |
| 2012/0270147 A1 | 10/2012 | Katoh et al. | |
| 2012/0270148 A1 | 10/2012 | Norikane et al. | |
| 2013/0010035 A1 | 1/2013 | Norikane et al. | |
| 2013/0034810 A1 | 2/2013 | Norikane et al. | |
| 2013/0069262 A1 | 3/2013 | Mulwa et al. | |
| 2013/0069263 A1 | 3/2013 | Katoh et al. | |

FOREIGN PATENT DOCUMENTS

| | | |
|---|---|---|
| CN | 101308340 A | 11/2008 |
| CN | 101542396 A | 9/2009 |
| CN | 101556442 A | 10/2009 |
| CN | 102436155 A | 5/2012 |
| CN | 102455610 A | 5/2012 |
| CN | 102455613 B | 11/2014 |
| JP | 2008-286947 | 11/2008 |
| JP | 2008-292976 | 12/2008 |
| JP | 2011-212668 | 10/2011 |

OTHER PUBLICATIONS

The Extended European Search Report issued Dec. 17, 2013, in Application No. / Patent No. 13171116.0-1351.

Combined Office Action and Search Report issued Mar. 13, 2015 in Chinese Patent Application No. 201310328428.4 (with English translation of categories of cited documents).

* cited by examiner

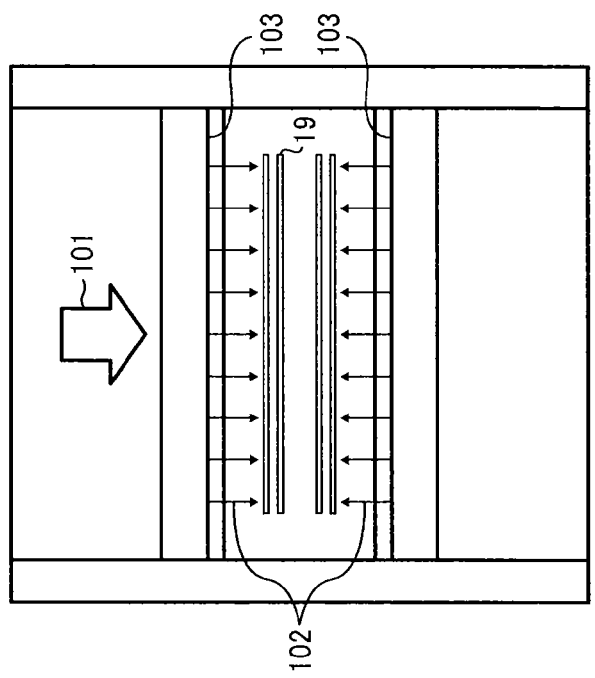
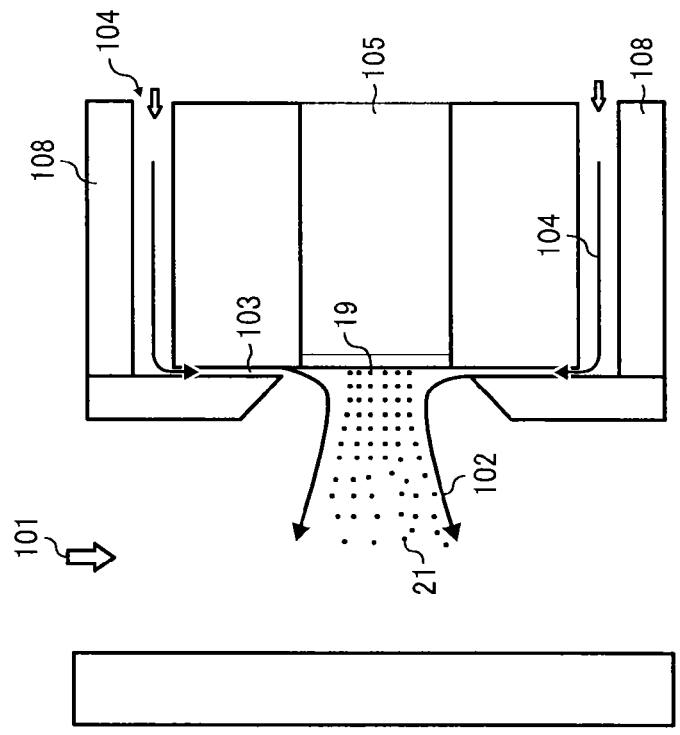

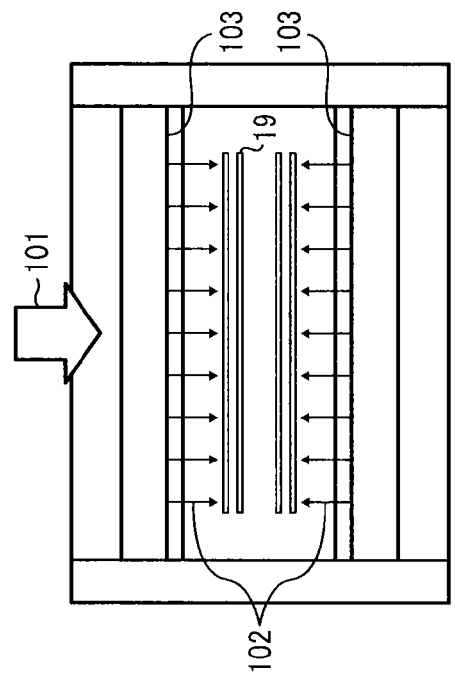
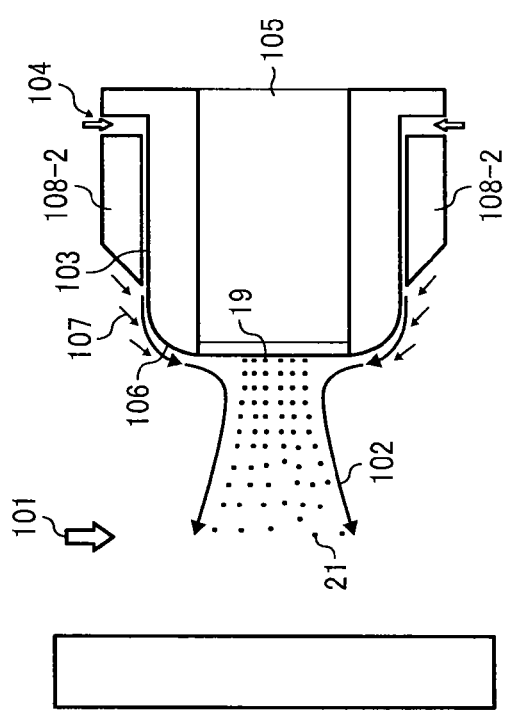
FIG. 9B
FIG. 9A

PARTICULATE MATERIAL PRODUCTION APPARATUS, AND PARTICULATE MATERIAL PRODUCTION METHOD

CROSS-REFERENCE TO RELATED APPLICATIONS

This patent application is based on and claims priority pursuant to 35 U.S.C. §119 to Japanese Patent Applications Nos. 2012-169751 and 2013-026466, filed on Jul. 31, 2012 and Feb. 14, 2013, respectively, in the Japan Patent Office, the entire disclosure of which is hereby incorporated by reference herein.

TECHNICAL FIELD

The present invention relates to a particulate material production apparatus, and a particulate material production method, each of which uses an ejection granulation method.

BACKGROUND

Uniformly-shaped particulate resins have been used for various purposes such as electrophotographic toner particles, spacer particles for use in liquid crystal panels, colored particles for use in electronic papers, and carriers of medical agents for use in drugs and medicines.

Specific examples of the method for producing such uniformly-shaped particulate resins include methods in which a particulate resin having a uniform particle diameter is produced by making a reaction in a liquid, such as soap-free polymerization methods. Soap-free polymerization methods generally have advantages such that a particulate resin having a relatively small particle diameter can be easily produced; the particle diameter distribution is sharp; and the particle form is nearly spherical. However, on the other side, soap-free polymerization methods have problems to be solved such that the production efficiency is bad because a solvent is removed from resin particles in a medium, which is typically water; it takes a long time for the polymerization process; and a long time and large amounts of water and energy are necessary for producing a particulate resin because it is necessary for the methods to perform various processes after the end of a solidification process, such as a process for separating the resultant particulate resin from the solvent used, and processes for repeatedly washing and drying the particulate resin, to produce the particulate resin.

In attempting to solve the problems mentioned above, one of the present inventors and other inventors propose a toner production method using an ejection granulation method in JP-2008-292976-A. Specifically, according to the toner production method, a toner is produced as follows. Namely, in a droplet ejecting unit to eject droplets of a toner composition liquid, which is a raw material of toner, a thin film, on which multiple nozzles are formed, is vibrated by an electromechanical converter serving as a vibration generator to periodically vibrate the thin film up and down. Thereby, the pressure in a chamber, which contains the toner composition liquid and which includes the thin film having the multiple nozzles as a constitutional member, is changed, resulting in ejection of droplets of the toner composition liquid from the nozzles to an air space below the nozzles in response to the periodical change of pressure. The thus ejected droplets of the toner composition liquid naturally fall through the air space and proceed in the same direction, thereby forming lines of droplets of the toner composition liquid. In this regard, the ejected droplets are reshaped so as to be spherical due to the difference in surface tension between the toner component liquid and air in the air space. The reshaped droplets are then dried, resulting in formation of a particulate toner.

In addition, one of the present inventors and other inventors propose a toner production method in JP-2008-286947-A in attempting to prevent uniting of ejected droplets. Specifically, in this second toner production method, droplets of a toner composition liquid are ejected from multiple nozzles to continuously form droplets of the toner composition liquid. In addition, an airflow forming device is provided to supply an airflow in the droplet ejection direction through a narrow passage provided on a downstream side relative to the droplet ejection direction, so that the droplets are fed by the airflow and thereby uniting of the droplets is prevented.

SUMMARY

As an aspect of the present invention, a particulate material production apparatus is provided which includes a droplet ejector to eject droplets of a particulate material composition liquid or a melted particulate material composition from nozzles; a solidifying device to solidify the droplets; a first airflow forming device to form a first airflow to feed the ejected droplets to the solidifying device with the first airflow; and a second airflow forming device to form a second airflow to apply the second airflow to the droplets right after the droplets are ejected from the droplet ejector (i.e., before the droplets are fed by the first airflow). The second airflow forming device forms the second airflow by supplying a pressed gas from a slit. In addition, the traveling direction of the first airflow is substantially perpendicular to the droplet ejection direction.

As another aspect of the present invention, a particulate material production method is provided which includes ejecting droplets of a particulate material composition liquid or a melted particulate material composition from nozzles in a droplet ejection direction; solidifying the ejected droplets to form a particulate material; feeding the ejected droplets with a first airflow having a traveling direction substantially perpendicular to the droplet ejection direction; and supplying a pressed gas from a slit to apply a second airflow to the ejected droplets before feeding the droplets with the first airflow.

The aforementioned and other aspects, features and advantages will become apparent upon consideration of the following description of the preferred embodiments taken in conjunction with the accompanying drawings.

BRIEF DESCRIPTION OF THE SEVERAL VIEWS OF THE DRAWINGS

FIGS. 8A and 8B are schematic views illustrating a uniting preventing device using a second airflow for use in the particulate material production apparatus;

FIGS. 9A and 9B are schematic views illustrating another uniting preventing device using a second airflow for use in the particulate material production apparatus;

DETAILED DESCRIPTION

Figure 1:
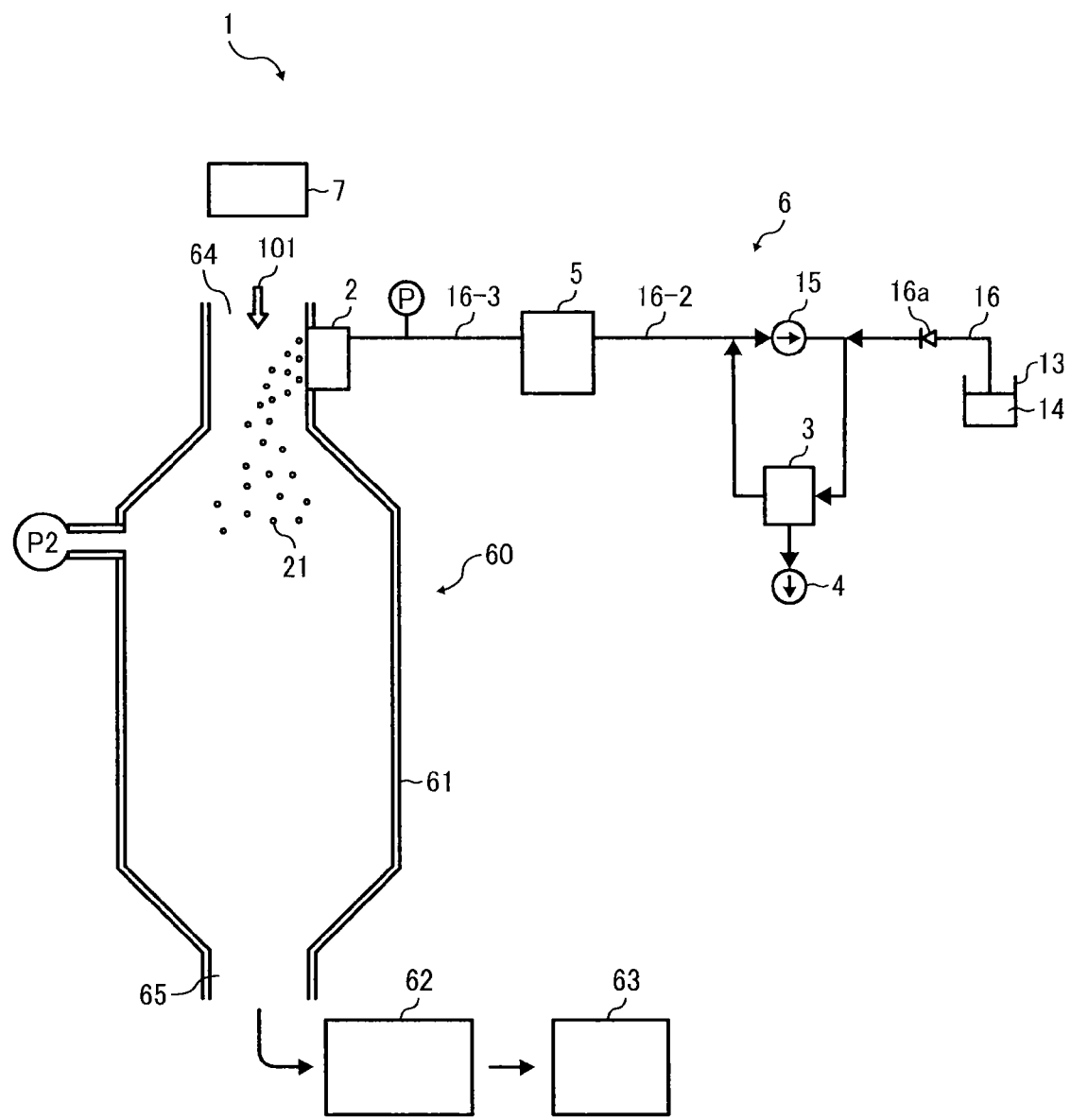
FIG. 1 is a schematic view illustrating an example of a particulate material production apparatus according to an embodiment of the present invention.

In the above-mentioned first toner production method disclosed in JP-2008-292976-A, the falling speed of the ejected droplets decreases due to friction between air and the droplets, and therefore the distance between a first toner droplet and a second toner droplet ejected right after the first toner droplet gradually decreases, thereby often forming a united toner droplet. Since the thus united toner droplet has a large volume, the falling speed of the united toner droplet decreases due to friction between air and the droplets because the toner droplet has a viscosity, and therefore the united toner droplet tends to be further united with following toner droplets. Thus, there is a mixture of single droplets and united droplets in the air space. When such a mixture is dried, toner particles having different particle diameters are produced, thereby deteriorating uniformity of the toner particles.

The above-mentioned second toner production method disclosed in JP-2008-286947-A may cause a case where an airflow is not supplied sufficiently to the droplets right after the droplets are ejected. Alternatively, since the narrow passage is provided on the downstream side of the air space, air turbulence is formed in the vicinity of the narrow passage, thereby often mixing adjacent lines of droplets of the toner composition liquid with each other, and therefore the droplets are united before reaching the drying/solidifying region.

The present invention is made to solve the problems mentioned above, and the object of the present invention is to provide a particulate material production apparatus or method using an ejection granulation method, which can produce a particulate material (such as toner) having a relatively narrow particle diameter distribution without causing the droplet uniting problem, and to provide a toner produced by the particulate material production apparatus or method.

The present invention will be described by reference to drawings.

Initially, the entire configuration of an example of a particulate material production apparatus according to an embodiment of the present invention will be described. The particulate material production apparatus according to an embodiment of the present invention includes a droplet ejector to eject droplets of a particulate material composition liquid or a melted particulate material composition from nozzles; a solidifying device to solidify the droplets to form a solid particulate material; and a first airflow forming device to form a first airflow to feed the ejected droplets to the solidifying device with the first airflow. The particulate material production apparatus is characterized by further including a second airflow forming device to form a second airflow to apply the second airflow to the droplets right after the droplets are ejected from the droplet ejector (i.e., before the droplets are fed by the first airflow), and is characterized in that the second airflow forming device forms the second airflow by supplying a pressed gas from a slit, and the traveling direction of the first airflow is substantially perpendicular to the droplet ejection direction.

The particulate material production apparatus according to an embodiment of the present invention will be described by reference to a particulate material production apparatus to produce a toner.

FIG. 1 is a schematic view illustrating the entirety of an example of a particulate material production apparatus according to an embodiment of the present invention.

Referring to FIG. 1, a particulate material production apparatus 1 includes, as main components, a droplet ejecting unit 2 serving as a droplet ejector, a liquid supplying unit 6, and a drying and collecting unit 60. The liquid supplying unit 6 supplies a liquid (such as a toner composition liquid or a melted toner composition) to the droplet ejecting unit 2. The droplet ejecting unit 2 ejects the liquid to form droplets 21 of the liquid. The drying and collecting unit 60 dries and solidifies the ejected droplets to form a particulate material (i.e., a toner in this case). Thus, by using these units, the particulate material production apparatus produces a toner as a particulate material.

The liquid ejected from the droplet ejector is a liquid including a particulate material composition or a melted particulate material composition. Specific examples of the liquid including a particulate material composition include liquids in which components of the particulate material composition are dissolved or dispersed in a medium such as solvents and liquid components of the particulate material composition. The liquid does not necessarily include a solvent as long as the liquid has a liquid state when ejected from the droplet ejecting device, and for example, melted particulate material compositions can also be used. The liquid to be ejected from the droplet ejector is hereinafter referred to as a particulate material composition liquid. Since toner is produced in this case, the particulate material composition liquid is hereinafter sometimes referred to as a toner composition liquid.

Next, the liquid supplying unit will be described.

The liquid supplying unit 6 supplies the liquid to the droplet ejecting unit 2, and includes a raw material container 13 to contain a toner composition liquid 14, a deaerator 3 to deaerate a gas included in the toner composition liquid 14, a first liquid supplying passage 16 to supply the toner composition liquid 14 from the raw material container 13 to the deaerator 3, a temporary storage container 5 serving as a temporary container and temporarily storing the deaerated toner composition liquid, a second liquid supplying passage 16-2 to supply the toner composition liquid 14 to the temporary storage container 5, and a third liquid supplying passage 16-3 to supply the toner composition liquid 14 from the temporary storage container 5 to the droplet ejecting unit 2.

The raw material container 13 contains the toner composition liquid 14, which has been prepared in another process. The toner composition liquid 14 in the raw material container 13 is supplied to the deaerator 3 through the first liquid supplying passage 16. The first liquid supplying passage 16 preferably has a check valve 16a to prevent the toner composition liquid 14 from flowing back from the deaerator 3 to the raw material container 13. In addition, it is preferable that the toner composition liquid 14 is agitated in the raw material container 13 to prevent precipitation of solid components included in the toner composition liquid 13.

The deaerator 3 is used for removing a gas dissolved in the toner composition liquid 14 to stably eject droplets of the toner composition liquid. Any known deaeration methods can be used for the deaerator 3, and specific examples thereof include methods in which the pressure in a container including a liquid is reduced to remove a gas dissolved in the liquid, and methods in which ultrasonic waves are applied to a liquid to deaerate the liquid. In this example, a deaerator (i.e., a deaeration module SEPAREL PF03DG from DIC Corporation), which uses a hollow fiber film, is used. Specifically, the toner composition liquid 14 is passed through a block of hollow fibers having a gas permeability while reducing the pressure in a container containing the block of hollow fibers with a pump 4, so that a gas dissolved in the toner composition liquid is removed therefrom.

In addition, the deaerator 3 can be set in a circulation passage in which the toner composition liquid is circulated in a closed system. When the deaerator 3 is set in such a circulation passage, the toner composition liquid 14 can be passed through the deaerator plural times. In this case, the amount of a gas remaining in the toner composition liquid can be reduced so as to be less than that in a case where the toner composition liquid is passed through the deaerator once. In FIG. 1, numeral 15 denotes a circulating pump.

Figure 2:
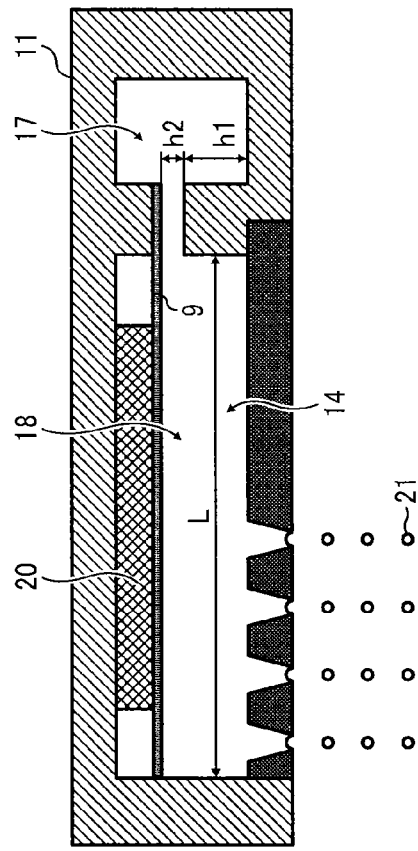
FIG. 2 is a schematic cross-sectional view illustrating a liquid column resonance type droplet ejecting device for use in the particulate material production apparatus illustrated in FIG. 1.

The temporary storage container 5 temporarily stores the deaerated toner composition liquid 14 while isolating the toner composition liquid from ambient air, and supplies the toner composition liquid 14 to the droplet ejecting unit 2. In order to stably eject droplets, it is preferable to properly control the pressure of the toner composition liquid 14 supplied to the droplet ejecting unit 2. Specifically, it is preferable that the pressure P1 applied to the droplet ejecting unit 2 is substantially equal to the pressure P2 in the drying and collecting unit 60. When P1 is higher than P2 (i.e., P1>P2), there is a possibility that a problem in that the toner composition liquid 14 exudes from ejection nozzles 19 of the droplet ejecting head serving as a droplet ejecting device is caused. When P1 is lower than P2 (i.e., P1<P2), there is a possibility that a gas (such as air) enters into the droplet ejecting head, thereby increasing risks of stopping of ejection of droplets from the droplet ejecting head. In FIG. 2, character P denotes a pressure gauge to measure the pressure of the liquid, and character P2 denotes a pressure gauge to measure the pressure in a chamber 61.

Next, the droplet ejecting unit 2 will be described.

The droplet ejecting unit 2 includes at least one droplet ejecting portion (droplet ejecting head), which includes a droplet ejecting device to eject, as droplets, the liquid supplied from the liquid supplying unit 6, and optionally includes a uniting preventing device, which charges the droplets so that the ejected droplets have charges with the same polarity or which controls the electric field applied to the droplets, to prevent uniting of the ejected droplets.

The droplet ejecting device used for the particulate material production apparatus of the present invention is not particularly limited, and any known droplet ejecting devices can be used as long as the ejected droplets have a relatively narrow particle diameter distribution. Specific examples of the droplet ejecting device include one-fluid type nozzles, two-fluid type nozzles, membrane oscillation type ejecting devices, Rayleigh fission type ejecting devices, liquid vibration type ejecting devices, and liquid column resonance devices (which is also called liquid column resonance type ejecting devices). Specific examples of the membrane oscillation type ejecting devices include ejecting devices disclosed in JP-2008-292976-A (corresponding to US20090317735 incorporated herein by reference). Specific examples of the Rayleigh fission type ejecting devices include the ejecting devices disclosed in JP-2007-199463-A or US20060210909 incorporated herein by reference. Specific examples of the liquid vibration type ejecting device include the ejecting devices disclosed in JP-2010-102195-A (corresponding to US20100104970 incorporated herein by reference).

The liquid column resonance devices apply vibration to a liquid in a liquid column resonance chamber, in which multiple ejection nozzles are formed to enhance the productivity of the product (i.e., toner in this case), to form a liquid column resonance standing wave, so that the liquid is ejected from nozzles located in a region in which the standing wave has an antinode, thereby forming droplets of the toner composition liquid. In this regard, the liquid column resonance device is characterized in that the ejected droplets have a very narrow particle diameter distribution and the productivity of the droplets is very high.

Any one of the above-mentioned ejecting devices is preferably used for the droplet ejecting device of the particulate material production apparatus of the present invention. Particularly, any one of the above-mentioned liquid column resonance type ejecting devices is preferably used. Specifically, the droplet ejecting device of the particulate material production apparatus of the present invention is preferably a device in which vibration is applied to a liquid (i.e., a particulate material composition liquid or a melted particulate material composition) contained in a liquid column resonance chamber having ejection nozzles to form a standing wave, so that the liquid is ejected from the nozzles located in a region in which the standing wave has an antinode, thereby forming droplets of the liquid.

Hereinafter, a liquid column resonance type ejecting device which ejects droplets utilizing liquid column resonance will be described.

The droplet ejecting unit 2 (illustrated in FIG. 1) is a liquid column resonance type ejecting device having multiple droplet ejecting heads. The droplet ejecting head serves as a droplet forming device for ejecting a liquid from ejection nozzles of a liquid column resonance chamber thereof, which has a droplet ejecting region communicated with outside through the nozzles and in which a liquid column resonance standing wave is generated under the condition mentioned below.

As illustrated in FIG. 2, a droplet ejecting device 11 includes a common liquid passage 17 and a liquid column resonance chamber (i.e., flow passage) 18. The liquid column resonance chamber 18 is communicated with the common liquid passage 17, which is provided on one of walls of the liquid column resonance chamber located at the ends thereof in the longitudinal direction thereof. The liquid column resonance chamber 18 has another wall connected with the longitudinal end walls and having droplet ejection nozzles 19 to eject droplets 21 of the toner composition liquid, and a vibration generating device 20, which is provided on another wall facing the ejection nozzles 19 and which generates high-frequency vibration to form a liquid column resonance standing wave in the liquid column resonance chamber 18. The vibration generating device 20 is connected with a high-frequency power source.

In the liquid column resonance chamber 18 in which the toner composition liquid 14 is contained, pressure distribution is formed due to the liquid column resonance standing wave generated by the vibration generating device 20, and the droplets 21 are ejected from the ejection nozzles 19, which are arranged in a region in which the standing wave has an antinode and in which the liquid column resonance standing wave has a large amplitude, and pressure largely fluctuates.

In this application, the region in which the liquid column resonance standing wave has an antinode means a region of the standing wave other than a wave node of the standing wave. It is preferable that at the region the standing wave has a large amplitude (i.e., a large pressure fluctuation) sufficient to eject droplets, and it is more preferable that the region is present in a region (hereinafter sometimes referred to as an antinode region) whose center is the maximum amplitude point of the pressure standing wave (i.e., the wave node of the velocity standing wave) and which has a length of ±¼ of the wavelength of the standing wave. When the multiple droplet ejection nozzles 19 are present in the antinode region, droplets ejected from the nozzles have substantially the same particle size even when the multiple nozzles are opened. In addition, since multiple nozzles can be used, droplets can be efficiently produced and a nozzle clogging problem in that the nozzles are clogged with the toner composition liquid is hardly caused.

The toner composition liquid 14 passing through the common liquid passage 17 is returned to the toner composition liquid container 13 through a liquid return tube (not shown).

When the amount of the toner composition liquid 14 in the liquid column resonance chamber 18 is decreased due to ejection of the droplets 21 of the toner composition liquid 14 from the nozzles 19, the force of sucking the toner composition liquid is increased by the action of the liquid column resonance standing wave in the liquid column resonance chamber 18, thereby increasing the amount of the toner composition liquid 14 supplied to the liquid column resonance chamber 18 from the common liquid passage 17. Therefore, the liquid column resonance chamber 18 is replenished with the toner composition liquid 14. When the liquid column resonance chamber 18 is replenished with the toner composition liquid 14, the flow rate of the toner composition liquid 14 flowing through the common liquid passage 17 returns to the normal flow rate.

Figure 3:
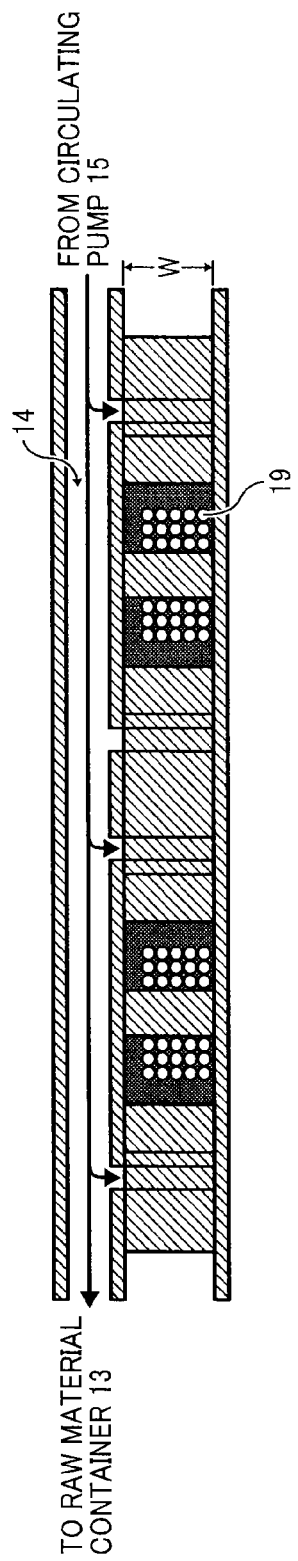
FIG. 3 is a schematic view illustrating a liquid column resonance type droplet ejecting unit for use in the particulate material production apparatus illustrated in FIG. 1 when the unit is observed from the droplet ejection surface side thereof.

The liquid column resonance chamber 18 of the liquid column resonance droplet ejecting device 11 is preferably constituted of frames, which are connected with each other and which are made of a material having a high rigidity (such as metals, ceramics and silicon) such that the resonance frequency of the toner composition liquid in the liquid column resonance chamber 18 is not affected by the frames. In addition, as illustrated in FIG. 2, a length L between two opposed longitudinal end walls of the liquid column resonance chamber 18 is determined based on the liquid column resonance principle mentioned below. Further, a width W (illustrated in FIG. 3) of the liquid column resonance chamber 18 is preferably less than ½ of the length L so as not to apply an extra frequency, by which the liquid column resonance is influenced. Furthermore, it is preferable to provide multiple liquid resonance chambers 18 in one liquid column resonance droplet ejecting unit (which includes multiple liquid column resonance droplet ejecting devices 11 arranged side by side) to dramatically improve the productivity of the toner. The number of the liquid resonance chambers 18 is not particularly limited, but it is most preferable that 100 to 2,000 liquid resonance chambers 18 are provided in one liquid column resonance droplet ejecting unit so that the toner production apparatus has a good combination of productivity and operationality. In this regard, a liquid flow passage is connected with each of the liquid column resonance chambers while connected with the common liquid passage 17 to supply the liquid, and therefore the common liquid passage 17 is connected with the multiple liquid column resonance chambers 18.

The vibration generating device 20 of the liquid column resonance droplet ejecting device 11 is not particularly limited as long as the device can be vibrated at a predetermined frequency, but is preferably a device in which a piezoelectric material is adhered to an elastic plate 9. In this regard, the elastic plate 9 constitutes part of the wall of the liquid column resonance chamber 18 to prevent the piezoelectric material form being contacted with the toner composition liquid. Specific examples of the materials for use as the piezoelectric material include piezoelectric ceramics such as lead zirconate titanate (PZT). However, in general the amount of displacement of such a material is small, and therefore laminates of piezoelectric materials are typically used therefor. In addition, piezoelectric polymers such as polyvinylidene fluoride (PVDF) and single crystals such as quart, $LiNbO_3$, $LiTaO_3$, and $KNbO_3$ can also be used as the piezoelectric material. Further, the vibration generating device 20 is preferably arranged in each liquid column resonance chamber to control vibration of the chamber. In addition, the vibration generating device 20 preferably has a structure such that a block of a vibrating member is cut so as to be arranged in each liquid column resonance chamber so that vibration of each liquid column resonance chamber can be separately controlled by the vibrating member via an elastic plate.

The diameter of each of the ejection nozzles 19 is preferably from 1 μm to 40 μm. When the diameter is less than 1 μm, the diameter of ejected droplets becomes too small, and therefore it often becomes difficult to produce toner particles having a desired particle diameter. In addition, when the toner composition liquid includes a solid particulate material such as pigments, the nozzle clogging problem is often caused, thereby deteriorating the productivity of the toner. In contrast, when the diameter is greater than 40 μm, the diameter of ejected droplets becomes too large. When toner particles having a diameter of from 3 μm to 6 μm are prepared using such large droplets, the toner composition liquid has to have a very low solid content (i.e., the toner composition liquid has to be diluted so as to be a thin liquid), and a large amount of energy is used for drying the ejected droplets to obtain a predetermined amount of toner, resulting in deterioration of productivity and increase of production costs.

In addition, it can be understood form FIG. 2 that the ejection nozzles 19 are preferably arranged so as to extend in the width direction of the liquid column resonance chamber 18, because the number of nozzles can be increased, thereby raising the production efficiency of the toner. Since the liquid column resonance frequency changes depending on the position of the ejection nozzles 19, it is preferable to properly determine the liquid column resonance frequency by checking whether desired droplets are ejected from the ejection nozzles 19.

Although the ejection nozzles 19 illustrated in FIG. 2 has a cross-section with a tapered shape (i.e., a trapezoidal shape) such that the diameter of the opening of a nozzle decreases toward the exit, the shape of the cross-section is not limited thereto, and can be selected from various shapes.

Examples of the cross-section of the ejection nozzles 19 are illustrated in FIGS. 4A-4D.

Figure 4A:
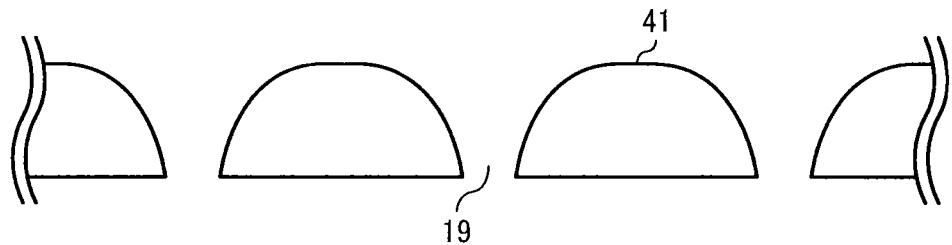
FIGS. 4A-4D are schematic cross-sectional views illustrating examples of the ejection nozzles of the droplet ejecting device.

The ejection nozzles illustrated in FIG. 4A have a cross-section such that a thin film 41 forming the nozzles 19 has a round surface from an upper surface contacted with the liquid toward the bottom surface forming the nozzle 19 in such a manner that the gap between one thin film and the adjacent thin film narrows toward the exit. When the thin film 41 is vibrated, the pressure applied to the liquid at the exit of the nozzle 19 is maximized. Therefore, the shape of the nozzles illustrated in FIG. 4A is most preferable to stably eject droplets.

Figure 4B:
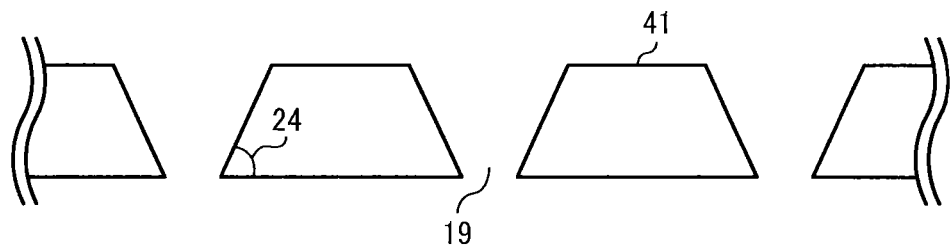

The ejection nozzles illustrated in FIG. 4B have a cross-section such that the thin film 41 forming the nozzles 19 is tapered from an upper surface contacted with the liquid toward the bottom surface forming the nozzles 19 in such a manner that the gap between one thin film and the adjacent thin film narrows toward the exit at a constant rate (namely the surface of the thin film 41 is slanted at a constant angle (i.e., nozzle angle 24)). The nozzle angle 24 can be set to a proper angle. Similarly to the nozzles illustrated in FIG. 4A, when the thin film 41 is vibrated, the pressure applied to the liquid at the exit of the nozzles 19 can be increased due to this nozzle angle 24. The nozzle angle 24 is preferably from 60° to 90°. When the nozzle angle 24 is not less than 60°, a sufficient pressure can be applied to the liquid, and in addition the thin film 41 has good processability (i.e., the thin film 41 can be easily prepared). When the nozzle angle 24 is 90°, the nozzles are the same as the nozzles illustrated in FIG. 4C. In the nozzles illustrated in FIG. 4C, it becomes hard to apply a pressure to the exit of the nozzle 19. Therefore, the maximum of the nozzle angle 24 is 90°. When the nozzle angle 24 is greater than 90°, it is hard to apply a pressure to the exit of the nozzle 19, thereby seriously destabilizing ejection of droplets.

Figure 4C:
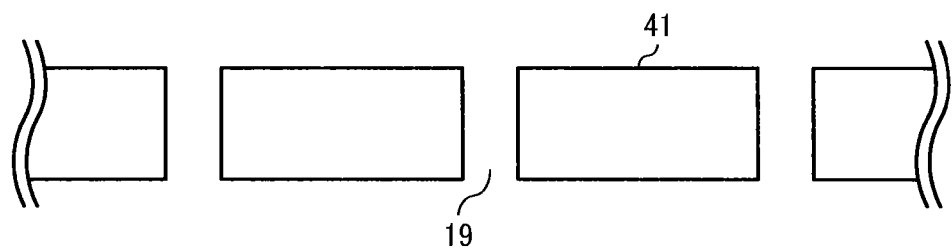
Figure 4D:
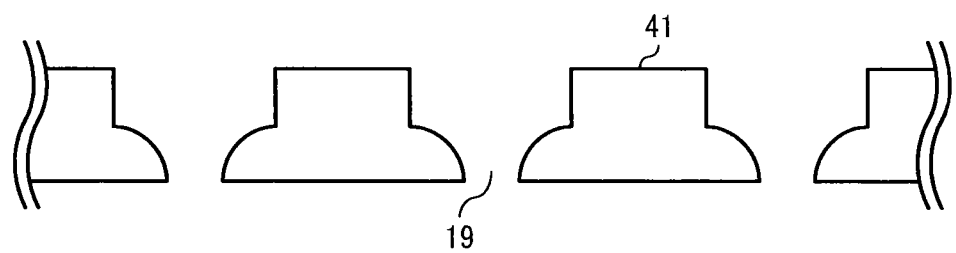

The ejection nozzles illustrated in FIG. 4D have a cross-section having a combined shape of the shape illustrated in FIG. 4A and the shape illustrated in FIG. 4C. It is possible that the shape of the ejection nozzles 19 is stepwise changed like the nozzles illustrated in FIG. 4D.

Next, the mechanism of forming droplets in the liquid column resonance droplet ejecting unit utilizing liquid column resonance will be described.

Initially, the principle of the liquid column resonance phenomenon caused in the liquid column resonance chamber 18 of the liquid column resonance droplet ejecting device 11 will be described. The wavelength ($\lambda$) of resonance of the toner composition liquid in the liquid column resonance chamber 18 is represented by the following equation (1):

$$\lambda = c/f \quad (1),$$

wherein c represents the acoustic velocity in the toner composition liquid, and f represents the frequency of vibration applied to the toner composition liquid by the vibration generating device 20.

As illustrated in FIG. 2, the length between the first end wall of the liquid column resonance chamber 18 and the second end wall of the column resonance chamber closer to the common liquid passage 17 is L. In addition, the height h1 (which is about 80 $\mu$m) of the second end wall is about twice the height h2 (which is about 40 $\mu$m) of the opening communicating the liquid column resonance chamber 18 with the common liquid passage 17. Provided that both the end walls are closed (i.e., the chamber 18 has two fixed ends), resonance can be formed most efficiently if the length L satisfied the following equation (2):

$$L = (N/4)\lambda \quad (2),$$

wherein N represents an even number.

Even in a chamber having two open ends, the above-mentioned equation (2) is also satisfied.

Similarly, in a chamber having one end, which has an escape route and which is equivalent to an open end, and one closed end (fixed end), namely, in a chamber having one fixed end or one open end, resonance can be formed most efficiently when the length L is equal to an odd multiple of one fourth of the wavelength $\lambda$. Namely, N is an odd number in the above-mentioned equation (2).

The most efficient drive frequency f, at which the resonance can be formed most efficiently, is represented by the following equation (3), which is obtained from the above-mentioned equations (1) and (2):

$$f = N \times c/(4L) \quad (3).$$

However, since liquids have viscosity, the resonance is decayed, and therefore vibration is not endlessly amplified. Namely, a liquid has a Q value, and, as represented by the below-mentioned equations (4) and (5), the liquid can cause resonance even at a frequency in the vicinity of the above-mentioned most efficient frequency f represented by equation (3).

FIGS. 5A-5D illustrate standing waves (in a resonance mode) of velocity fluctuation and pressure fluctuation when N is 1, 2 or 3. FIGS. 6A-6C illustrate standing waves (in a resonance mode) of velocity fluctuation and pressure fluctuation when N is 4 or 5. In reality, the waves are a compression wave (longitudinal wave), but are generally illustrated as such waves as illustrated in FIGS. 5 and 6. In FIGS. 5 and 6, a velocity standing wave is illustrated by a solid line, and a pressure standing wave is illustrated by a broken line.

Figure 5A:
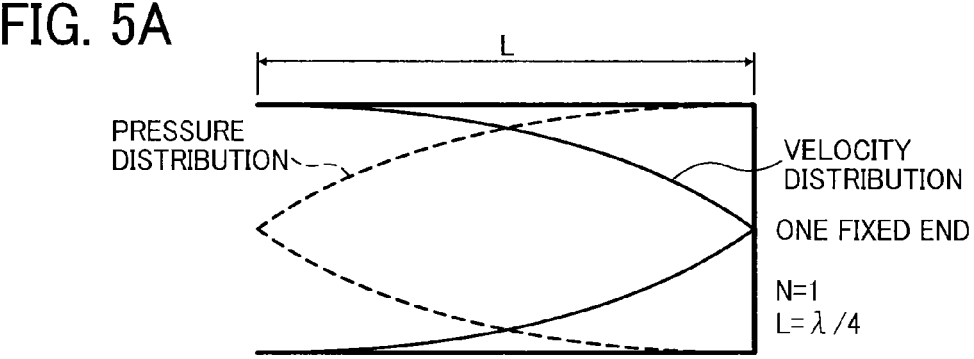
FIGS. 5A-5D are schematic views illustrating standing waves of velocity fluctuation and pressure fluctuation formed when N=1, 2 or 3.

For example, in a case illustrated in FIG. 5A, in which the liquid column resonance chamber has one fixed end and N is 1, the frequency of the velocity distribution becomes zero at the closed end while having a maximum value at the open end. Thus, it can be easily understood intuitively. When the length between the ends of the liquid column resonance chamber in the longitudinal direction thereof is L, the wavelength of resonance is $\lambda$, and N is 1, 2, 3, 4 or 5, the standing wave can be formed most efficiently. Since the shape of the standing wave changes depending on the states (i.e., opened or closed state) of both the ends of the liquid column resonance chamber, the states are also illustrated in FIGS. 5 and 6. As mentioned later, the states of the ends are determined depending on the conditions of the openings of the ejection nozzles and the opening from which the liquid is supplied to the chamber.

In acoustics, an open end means an end at which the moving velocity of a medium (liquid) in the longitudinal direction is maximized while the pressure is minimized. In contrast, a closed end is defined as an end at which the moving velocity of a medium becomes zero. Namely, the closed end is considered to be a hard wall in acoustics, and reflection of a wave is caused. When the liquid column resonance chamber has an ideal open end or an ideal closed end, such resonance standing waves as illustrated in FIGS. 5 and 6 are formed. However, the pattern of the standing waves changes depending on the number of the ejection nozzles and the positions of the nozzles, and therefore the most efficient frequency f may be slightly different from that obtained from equation (3). In such a case, by adjusting the drive frequency, stable ejection conditions can be established.

For example, in a case where the acoustic velocity c is 1,200 m/s in the liquid used, the length L of the liquid column resonance chamber is 1.85 mm, both the ends are equivalent to closed ends, and the resonance mode is an N=2 resonance mode, the most efficient frequency f is determined as 324 kHz from the above-mentioned equation (3). In addition, in another case where the acoustic velocity c is 1,200 m/s in the liquid, the length L of the liquid column resonance chamber is 1.85 mm, both the ends are equivalent to closed ends, and the resonance mode is an N=4 resonance mode, the most efficient frequency f is determined as 648 kHz from equation (3). In the latter case, higher-degree resonance can be used than in the former case although the structures of the liquid column resonance chambers are the same.

Figure 5B:
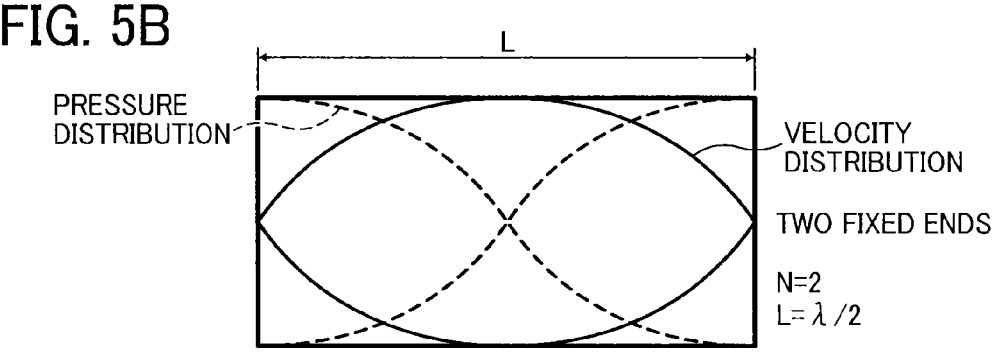
Figure 5C:
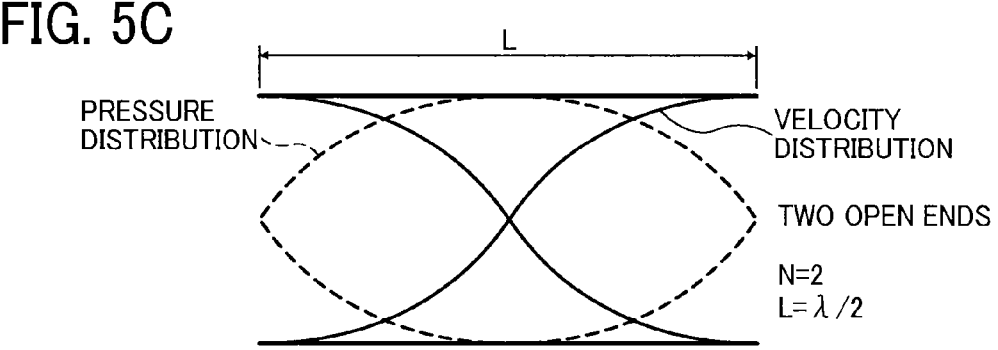
Figure 5D:
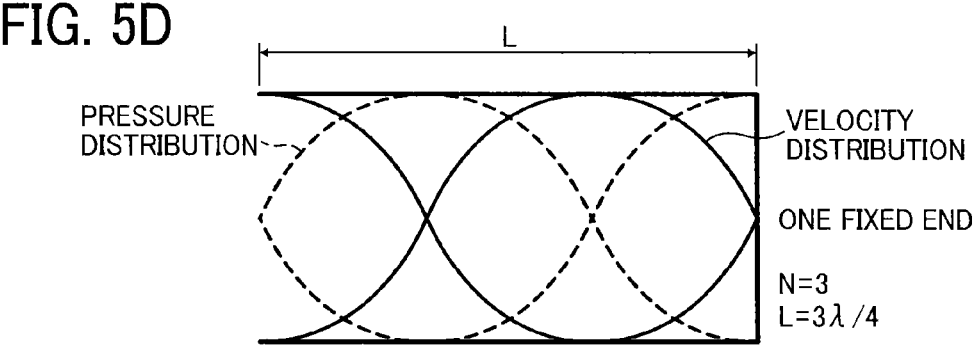
Figure 6A:
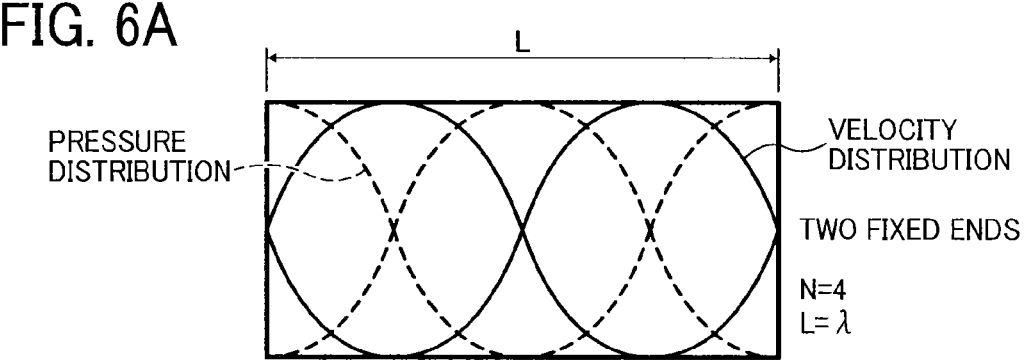
FIGS. 6A-6C are schematic views illustrating standing waves of velocity fluctuation and pressure fluctuation formed when N=4 or 5.
Figure 6B:
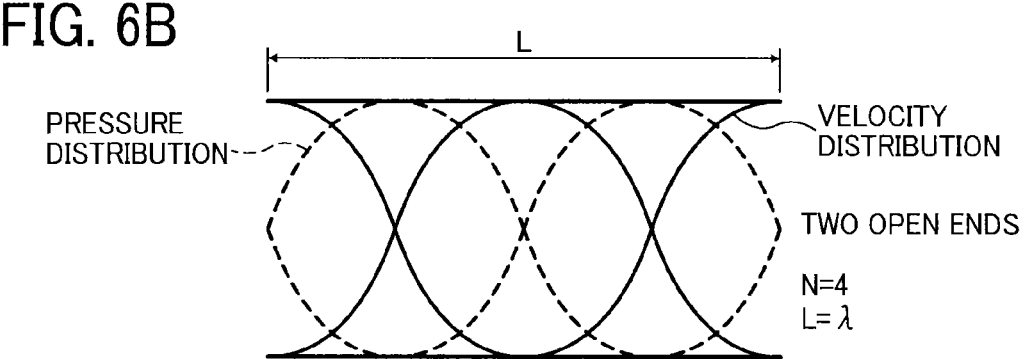
Figure 6C:
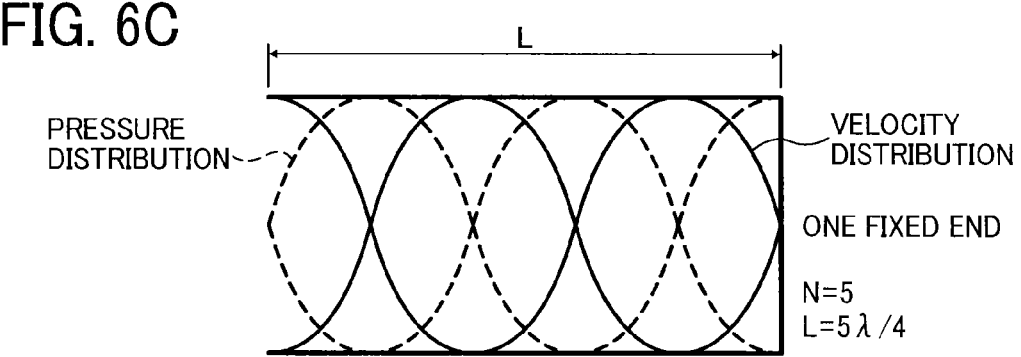

It is preferable for the liquid column resonance chamber of the liquid column resonance droplet ejecting device 11 illustrated in FIG. 2 that both the ends are equivalent to two closed ends or ends considered to be acoustically soft walls due to the openings of the nozzles to increase the most efficient frequency. However, the ends of the liquid column resonance chamber are not limited thereto, and can be open ends. In this regard, the influence of the openings of the ejection nozzles is such that the acoustic impedance is decreased thereby, and particularly the compliance is increased thereby. Therefore, the liquid column resonance chamber preferably has such a structure as illustrated in FIG. 5B or 6A, in which walls are formed at both the ends of the liquid column resonance chamber in the longitudinal direction thereof, because all of the resonance modes in the two-closed-end structures and the resonance modes in the one-open-end structures in which the wall on the nozzle side is considered to be an open end can be used.

Since the factors contributing to determination of the drive frequency are the number of openings of the ejection nozzles, the positions of the openings, and the cross-sectional shape of the ejection nozzles, the drive frequency can be properly determined according to these factors. For example, when the number of openings of the ejection nozzles is increased, the fixed end of the liquid column resonance chamber is loosely bounded so as to be similar to an open end, and the generated standing wave becomes similar to a standing wave formed in a chamber having an open end, resulting in increase of the drive frequency. In addition, the wall of the liquid column resonance chamber in the vicinity of the nozzles is loosely restricted, wherein the opening (nozzle) closer to the common liquid passage 17 is an origin. Further, when the ejection nozzles have a round cross-section, or the volume of the nozzles varies depending on the thickness of the frame of the chamber having the nozzles, the real standing wave has a shorter wavelength, and therefore the frequency of the wave becomes higher than the drive frequency. When a voltage is applied to the vibration generating device at the thus determined drive frequency, the vibration generating device is deformed and thereby a resonance standing wave can be generated most efficiently at the drive frequency. In this regard, a resonance standing wave can also be generated at a frequency in the vicinity of the most efficient drive frequency. Namely, when the length between both the ends of the liquid column resonance chamber in the longitudinal direction thereof is L, and the length between the end of the chamber closer to the common liquid passage and the nozzle closest to the end is Le, droplets of the toner composition liquid 14 can be ejected from the nozzles by liquid column resonance caused by vibrating the vibration generating device using a drive wave including, as a main component, a drive frequency f in the range represented by the following relationships (4) and (5):

$$N \times c/(4L) \leq f \leq N \times c/(4Le) \quad (4), \text{ and}$$

$$N \times c/(4L) \leq f \leq (N+1) \times c/(4Le) \quad (5).$$

The ratio (Le/L) of the length Le between the end of the chamber closer to the common liquid passage and the nozzle closest to the end to the length L between both the ends of the liquid column resonance chamber in the longitudinal direction thereof is preferably greater than 0.6.

By utilizing the liquid column resonance phenomenon mentioned above, a liquid column resonance standing wave of pressure is formed in the liquid column resonance chamber 18 illustrated in FIG. 2, thereby continuously ejecting droplets of the toner composition liquid from the ejection nozzles 19, which are arranged on a portion of the liquid column resonance chamber 18. In this regard, it is preferable to arrange the ejection nozzles 19 on a position, at which the pressure of the standing wave varies most largely, because the droplet ejection efficiency is enhanced, and thereby the droplet ejecting unit can be driven at a low voltage.

Although it is possible that one liquid column resonance chamber 18 has one ejection nozzle, it is preferable that one chamber has multiple ejection nozzles, preferably from 2 to 100 nozzles, to enhance the productivity. When the number of nozzles is greater than 100, the voltage applied to the vibration generating device 20 has to be increased in order to form droplets having a desired particle diameter. In this case, the piezoelectric material serving the vibration generating device tends to operate unstably.

The distance between two adjacent ejection nozzles is preferably not less than 20 μm and less than the length of the liquid column resonance chamber 18. When the distance between two adjacent nozzles is less than 20 μm, the chance of collision of droplets ejected from the two adjacent nozzles is increased, thereby forming large particles, resulting in deterioration of the particle diameter distribution of the resultant toner.

Next, the liquid column resonance phenomenon caused in the liquid column resonance chamber 18 in the liquid column resonance droplet ejecting device will be described by reference to FIGS. 7A-7D. In FIGS. 7A-7D, a solid line represents the velocity distribution of the toner component liquid 14 at any position of from the fixed end to the other end closer to the common liquid passage 17 (illustrated in FIG. 2). In this regard, when the solid line is present in a positive (+) region, the toner component liquid 14 flows from the common liquid passage 17 toward the liquid column resonance chamber 18. When the solid line is present in a negative (−) region, the toner component liquid 14 flows in the opposite direction. A broken line represents the pressure distribution of the toner component liquid 14 at any position of from the fixed end to the other end closer to the common liquid passage 17. In this regard, when the broken line is present in a positive (+) region, the pressure in the chamber 18 is higher than atmospheric pressure (i.e., the pressure is a positive pressure). When the broken line is present in a negative (−) region, the pressure is lower than atmospheric pressure (i.e., the pressure is a negative pressure). Specifically, when the pressure in the chamber 18 is a positive pressure, a downward pressure is applied to the toner component liquid 14 in FIG. 7. In contrast, when the pressure is a negative pressure, an upward pressure is applied to the toner component liquid in FIG. 7. In this regard, although the end of the liquid column resonance chamber 18 closer to the common liquid passage 17 is opened as mentioned above, the height (h1 in FIG. 2) of the frame (fixed end) of the liquid column resonance chamber 18 is not less than about twice the height (h2 in FIG. 2) of the opening connecting the chamber 18 with the common liquid passage 17, and therefore temporal changes of the velocity distribution curve and the pressure distribution curve are illustrated in FIGS. 7A-7D while assuming that the liquid column resonance chamber 18 has two fixed ends.

Figure 7A:
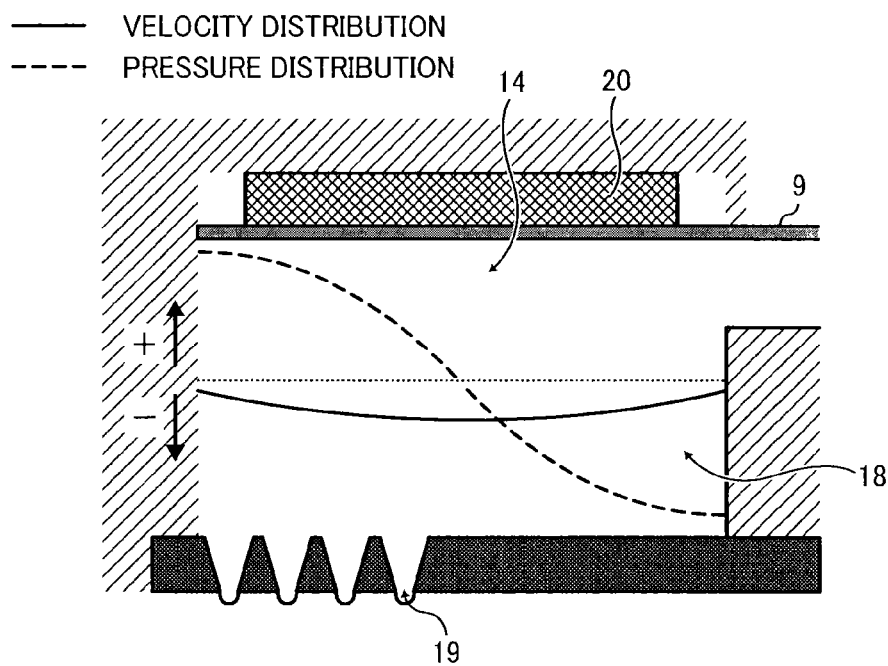
FIGS. 7A-7D are schematic views illustrating how a liquid column resonance phenomenon occurs in a liquid column resonance chamber of the droplet ejecting device.
Figure 7B:
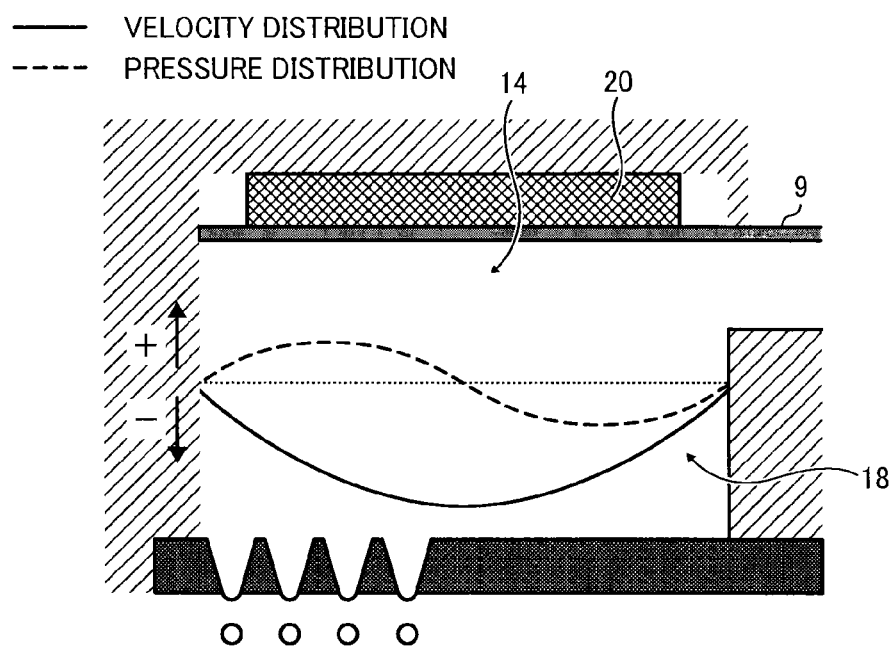

FIG. 7A illustrates the pressure waveform and the velocity waveform in the liquid column resonance chamber 18 just when droplets are ejected from the droplet ejection nozzles 19. As illustrated in FIG. 7A, the pressure in a portion of the toner component liquid above the nozzles 19 in the liquid column resonance chamber 18 is maximized, and thereby the toner component liquid is excluded from the nozzles 19 as liquid columns. Next, as illustrated in FIG. 7B, the positive pressure in the vicinity of the nozzles 19 is decreased so as to approach the negative region (pressure), and thereby the liquid columns of the toner component liquid are cut, resulting in ejection of the droplets 21.

Figure 7C:
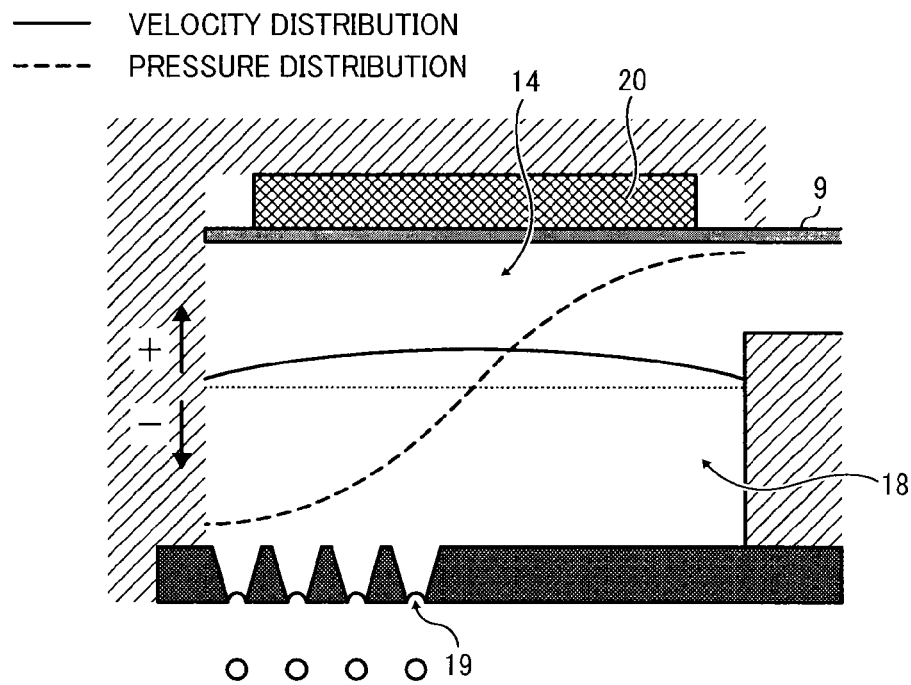
Figure 7D:
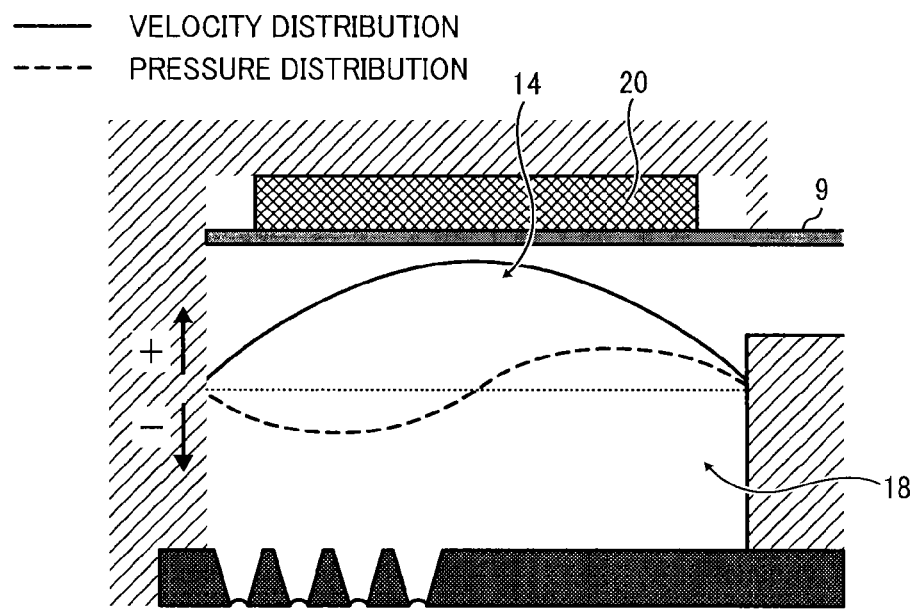

After droplets are ejected, the pressure in the vicinity of the ejection nozzles 19 is minimized (i.e., maximized in the negative region) as illustrated in FIG. 7C. In this case, feeding the toner composition liquid 14 to the liquid column resonance chamber 18 from the common liquid passage 17 is started. Next, as illustrated in FIG. 7D, the negative pressure in the vicinity of the ejection nozzles 19 is decreased, and the pressure is changed toward a positive pressure. Thus, filling the toner composition liquid 14 is completed. Next, the positive pressure in the droplet ejection area of the liquid column resonance chamber 18 is maximized as illustrated in FIG. 7A, and then the droplets 21 of the toner component liquid 14 are ejected from the ejection nozzles 19.

Thus, since a liquid column resonance standing wave is formed in the liquid column resonance chamber 18 by driving the vibration generating device with a high frequency wave, and in addition the droplet ejection nozzles 19 are arranged in a region corresponding to the antinode of the standing wave, in which the pressure varies most largely, the droplets 21 of the toner component liquid 14 can be continuously ejected from the droplet ejection nozzles 19 in a cycle corresponding to the cycle of the antinode.

An experiment of this droplet ejection operation utilizing the liquid column resonance phenomenon was performed. Specifically, in the experiment the longitudinal direction length (L) of the liquid column resonance chamber 18 illustrated in FIG. 2 is 1.85 mm, and the resonance mode is the N=2 resonance mode. In addition, the droplet ejection nozzles have first to fourth nozzles at a location corresponding to the antinode of the pressure standing wave in the N=2 mode, and a sine wave having a frequency of 330 kHz was used to eject droplets of a toner composition liquid. In this regard, the diameter of openings of the ejection nozzles 19 is 10 μm. As a result of observation using a laser shadowgraphy method, droplets of the toner composition liquid, which have substantially the same particle diameter, were ejected from the four nozzles at substantially the same speed. At a drive frequency in the vicinity of 330 kHz, the velocities of droplets ejected from the first to fourth nozzles were substantially the same while the ejection velocities were maximized. Therefore, it could be confirmed that droplets of the toner composition liquid are evenly ejected from the position corresponding to the antinode of the liquid column resonance standing wave at the second mode of the liquid column resonance frequency (i.e., 330 kHz).

Next, a uniting preventing device will be described.

When the droplets 21 ejected from the droplet ejecting device are contacted before the droplets are dried, the droplets are united, thereby forming a large droplet. This phenomenon is hereinafter referred to as uniting. When uniting of droplets occurs, the resultant particulate material has a broad particle diameter distribution. Therefore, in order to produce a particulate material having a narrow particle diameter distribution, uniting of droplets is not preferable.

When a uniting preventing device is not provided, the speed of the droplets 21 ejected from the droplet ejecting device gradually decreases due to fluid resistance of the gas surrounding the droplets although the droplets have a certain initial speed right after the droplets are ejected. Therefore, a droplet ejected later catches up a previously-ejected droplet, resulting in occurrence of uniting of the droplets. Similarly, when droplets ejected from adjacent nozzles are contacted with each other before the droplets are dried, the droplets are united.

Therefore, in order to produce a dry particulate material having a sharp particle diameter distribution, it is preferable for the ejected droplets to keep enough space therebetween so that the droplets are not united.

Specific examples of the uniting preventing device include a device which supplies an airflow toward the vicinity of the ejection nozzles; a device which charges the ejected droplets so as to have charges having the same polarity; and an electric field controlling device. The particulate material production apparatus of the present invention is characterized by including a second airflow forming device which applies a second airflow to the droplets right after the droplets are ejected from the droplet ejecting device. By applying a second airflow to the droplets right after the droplets are ejected, probability of uniting of the droplets can be decreased. Namely, the second airflow forming device serves as the uniting preventing device in the particulate material production apparatus of the present invention.

Next, the second airflow mentioned above will be described.

By feeding the droplets, which are ejected from the droplet ejecting device, with the first airflow, the droplets are prevented form approaching to each other, and probability of uniting of the droplets can be decreased. The particulate material production apparatus of the present invention supplies a pressed gas from a slit to further apply a second airflow to the droplets right after the droplets are ejected. By applying such a second airflow, probability of uniting of the droplets can be further decreased.

Specific examples of the method of forming a second airflow include a method in which an airflow having the same traveling direction as the droplet ejection direction is formed to prevent the droplets from decelerating; a method in which an airflow having a traveling direction slanting relative to the droplet ejection direction is formed to change the flight direction of the droplets; and a combination method of the above-mentioned two methods. When the second-mentioned method is used, the angle (i.e., traveling direction) of the airflow relative to the droplet ejection direction is not particularly limited, but it is preferable that the traveling direction of the airflow is substantially perpendicular to the droplet ejection direction.

When the droplet ejection surface of the droplet ejecting device, on which the ejection nozzles are formed, has a rectangle shape, it is preferable that the second airflow is applied in a direction parallel to a shorter side of the rectangular surface of the droplet ejecting device as illustrated in FIG. 8B. By using this method, probability of uniting of the ejected droplets can be further decreased.

The traveling direction of the second airflow can be changed by changing the position of the slit. Alternatively, the traveling direction of the second airflow can also be controlled by the Coanda effect. The Coanda effect means a phenomenon in which jet flows along a convex surface. Specifically, in order to control the traveling direction of an airflow using the Coanda effect, for example, a method, in which a gas is sprayed from a gas injection slit or the like toward a droplet ejecting device having a smoothly curved surface (i.e., surface having a curvature) so that the gas flows along the smoothly curved surface, can be used. By using this method, the travelling direction of the second airflow supplied from the slit is curved by the curved surface of the droplet ejecting device, thereby making it possible to control the travelling direction of the second airflow.

Specific examples of the second airflow forming device to form the second airflow include an airflow forming member, which is provided on the droplet ejecting device (such as droplet ejecting heads). In this case, the slit is, for example, a gap formed between a surface of an end of the droplet ejecting device at the droplet ejection side and the airflow forming member, which is arranged in the vicinity of the end surface with the gap therebetween.

The second airflow forming device supplies a gas, which is supplied from a gas pressing device while pressed, to a gas spraying slit from a gas entrance to form a second airflow. The thus formed second airflow feeds the droplets ejected from the ejection nozzles of the droplet ejecting device.

The gas pressing device is not particularly limited, and any known devices such as compressors and blowers can be used therefor. The pressure of the pressed gas is not particularly limited, and is not less than a pressure at which the pressed gas sprayed from a slit can have such a speed as to prevent uniting of the ejected droplets. For example, in a case where a gas is sprayed from the above-mentioned gas spraying slit, by pressing the gas at a pressure of from 0.1 to 0.5 MPa, an airflow having such a speed as to decrease the probability of uniting of the droplets can be formed although the pressure changes depending on the size of the gap and the width of the slit. The speed of the second airflow is set to a proper speed depending on the ejection speed of the droplets, so that the probability of uniting of the droplets can be decreased by the second airflow. For example, when the droplet ejection speed is ten-odd m/s, the speed of the second airflow is set to 7 m/s or more to decrease the probability of uniting of the ejected droplets. In this regard, the higher the speed of the second airflow, the better the effect to preventing uniting of the ejected droplets, and therefore the speed of the second airflow is preferably as high as possible. From this point of view, the speed of the second airflow is preferably not lower than 15 m/s, and more preferably not lower than 25 m/s. When the speed of the second airflow is not lower than 25 m/s, the probability of uniting of the ejected droplets can be considerably decreased, and a particulate material having a sharp particle diameter distribution can be produced.

The gap of the slit is preferably not less than 0.05 mm and not greater than 5 mm, and more preferably from 1 mm to 3 mm.

When the gap of the slit is not greater than 5 mm, occurrence of a problem in that when the two opposed second airflows collide with each other, a large air stagnation portion having a low airflow speed is formed in the vicinity of the droplet ejecting head can be prevented, and therefore the droplets can be well accelerated right after the droplets are ejected. In addition, the width of the slit is preferably wider than the length of a line of ejection nozzles. By supplying such a pressed gas as mentioned above to such a slit, an airflow, by which uniting of the ejected droplets can be prevented, can be supplied.

An example of the second airflow forming device will be described by reference to FIGS. 8A and 8B. FIG. 8A is a cross-sectional view illustrating the second airflow forming device, and FIG. 8B is a view illustrating the second airflow forming device from the droplet ejection surface side.

The second airflow forming device illustrated in FIGS. 8A and 8B has a structure such that airflow forming members 108 are arranged so as to face the corresponding end surfaces of a droplet ejecting head 105, which has the ejection nozzles 19 to eject the droplets 21, with a gap therebetween, thereby forming two opposed gas spraying slits 103. By supplying a pressed gas 104 to the two opposed slits 103, second airflows having traveling directions perpendicular to the droplet ejection direction can be supplied to the ejected droplets 21 right after the droplets are ejected. In this regard, since the second airflows are supplied from two opposed directions, the airflows collide with each other, thereby forming an airflow 102 (i.e., a combined second airflow) having the same traveling direction as the droplet ejection direction. The thus formed combined second airflow 102 prevents the ejected droplets from decelerating, thereby preventing uniting of the droplets. It is preferable that the gas spraying slit 103 and the droplet ejection surface of the droplet ejecting head are located on the same plane to supply the second airflows to the droplets 21 right after the droplets are ejected from the nozzles 19.

The tip of each of the airflow forming members 108 is preferably tapered toward the exit of the slit 103 as illustrated in FIG. 8A to prevent a first airflow 101, which is supplied from a different direction as illustrated in FIG. 8A, from being turbulent, thereby making it possible to feed the droplets without uniting the droplets.

Another example of the second airflow forming device will be described by reference to FIGS. 9A and 9B. FIG. 9A is a cross-sectional view of the second airflow forming device, and FIG. 9B is a view illustrating the second airflow forming device from the droplet ejection surface side.

The second airflow forming device illustrated in FIGS. 9A and 9B has a structure such that airflow forming members 108-2 are arranged so as to face the corresponding side surfaces of the droplet ejecting head 105, which has the ejection nozzles 19 to eject the droplets 21, with a gap therebetween, thereby forming two gas spraying slits 103, each of which extends in a direction parallel to the droplet ejection direction. In addition, each of the side walls (end walls) of the droplet ejecting head 105 has a curved portion having a curvature on the tip thereof, and therefore the airflow, which is supplied from the slit 103 and which flows in the vicinity of the side wall, is curved along the curved portion due to Coanda effect, thereby forming a second airflow 107 whose traveling direction is perpendicular to the droplet ejection direction. This second airflow collides with another second airflow, which is opposed to the second airflow, in the vicinity of the ejection nozzles 19, thereby forming a combined second airflow 102 whose travelling direction is parallel to the droplet ejection direction. Thus, the combined second airflow 102 can be applied to the droplets right after the droplets are ejected from the ejection nozzles 19. In this regard, since the gas supplied from the slit 103 involves the ambient gas, the amount of the gas in the resultant airflow is larger than that of the gas supplied from the slit. In addition, this airflow forming device has an advantage such that the device is compact.

Figure 10A:
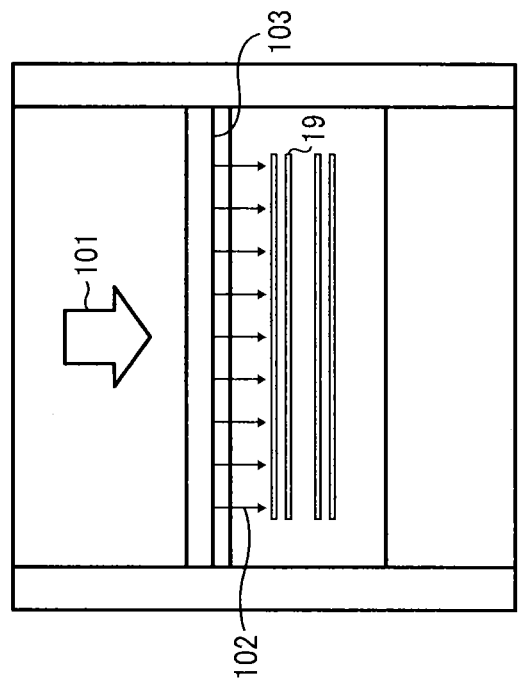
FIGS. 10A and 10B are schematic views illustrating another uniting preventing device using a second airflow for use in the particulate material production apparatus.

Another example of the second airflow forming device will be described by reference to FIGS. 10A and 10B. FIG. 10A is a cross-sectional view of the second airflow forming device, and FIG. 10B is a view illustrating the second airflow forming device from the droplet ejection surface side.

Figure 10B:
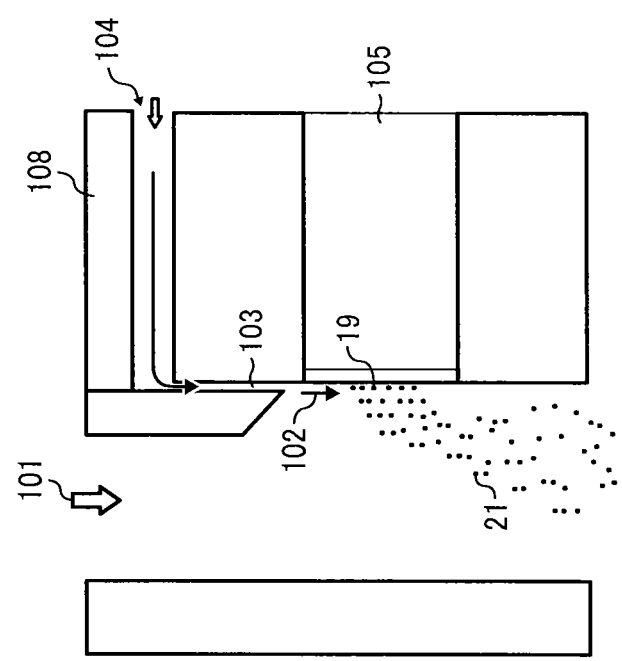

The second airflow forming device illustrated in FIGS. 10A and 10B is an example in which the flight direction of droplets is changed to prevent uniting of the droplets. The second airflow forming device includes an airflow forming member 108 arranged so as to face the corresponding end surface of the droplet ejecting head 105 with a gap therebetween, and has a structure such that the airflow forming member is arranged on one side of the flow passage through which the first airflow 101 is supplied. Specifically, the airflow forming member 108 is arranged on an upstream side from the ejection nozzles 19 relative to the flowing direction of the first airflow 101. The gas 104 supplied through the gas spraying slit 103, which is a gap formed by the droplet ejecting head 105 and the airflow forming member 108, becomes a second airflow 102 whose traveling direction is perpendicular to the droplet ejection direction in the vicinity of the ejection nozzles 19. The flight direction of the droplets can be changed by the second airflow 102 supplied from the gas spraying slit 103 right after the droplets are ejected. In addition, since the first airflow 101 flows from top to bottom in FIG. 10A, the droplets 21 are gradually scattered while the flight directions thereof are changed, thereby increasing the distance between the droplets, resulting in reduction of probability of uniting of the droplets. Similarly to the airflow forming member of the airflow forming device illustrated in FIG. 8A, this airflow forming member 108 is preferably tapered toward the exit of the slit 103 as illustrated in FIG. 10A.

Another example of the second airflow forming device will be described by reference to FIGS. 11A and 11B. FIG. 11A is a cross-sectional view of the second airflow forming device, and FIG. 11B is a view illustrating the second airflow forming device from the droplet ejection surface side.

Figure 11B:
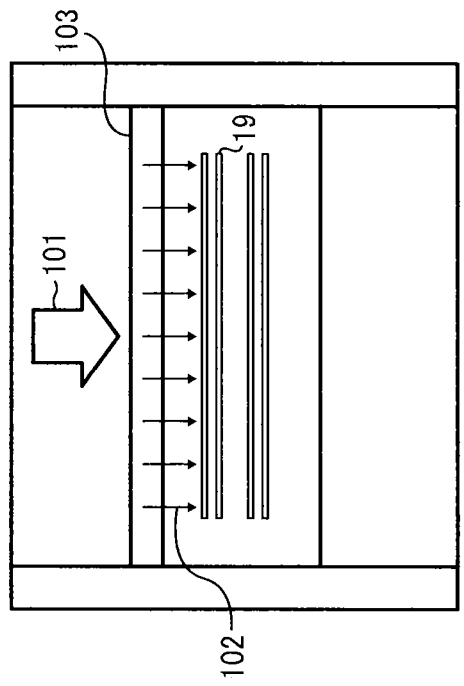
FIGS. 11A and 11B are schematic views illustrating another uniting preventing device using a second airflow for use in the particulate material production apparatus.
Figure 11A:
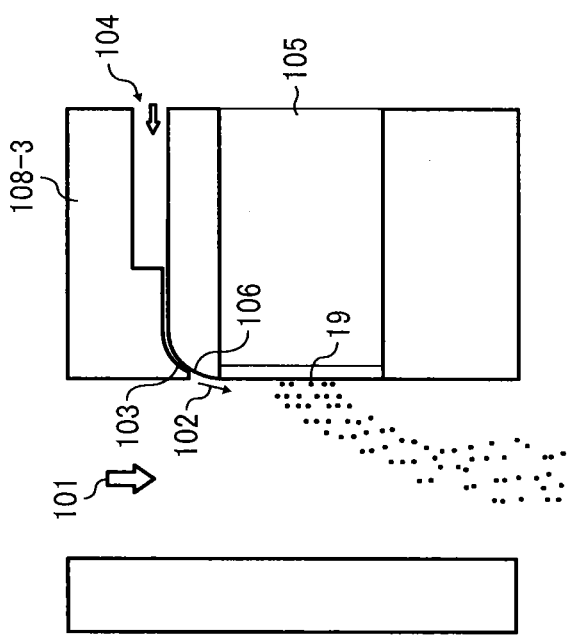
Figure 12:
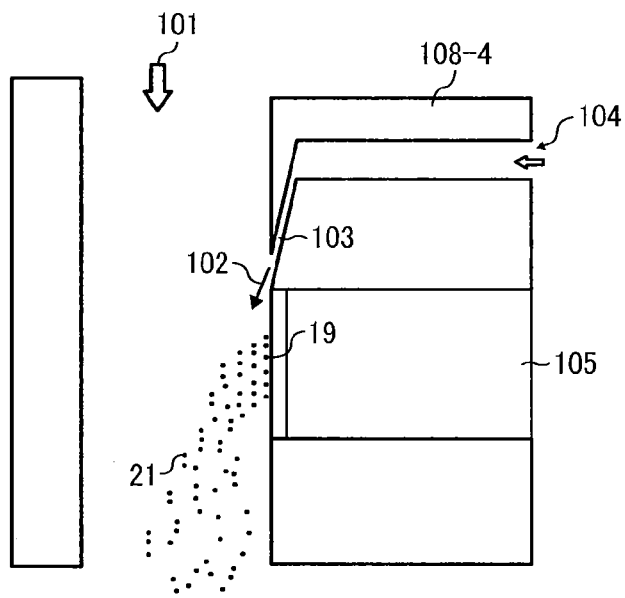
FIG. 12 is a schematic view illustrating another uniting preventing device using a second airflow for use in the particulate material production apparatus.

The second airflow forming device illustrated in FIGS. 11A and 11B is an example in which the flight direction of droplets is changed to prevent uniting of the droplets. As illustrated in FIG. 11A, the surface of the shoulder of a side wall (end wall) of the droplet ejecting head 105 is curved, and an airflow forming member 108-3 is arranged so as to face the curved portion with a gap therebetween to form a slit 103. The airflow forming member 108-3 is arranged on an upstream side from the ejection nozzles 19 relative to the flowing direction of the first airflow 101. In addition, the end surface of the airflow forming member 108-3 and the ejection nozzle surface are located on the same plane as illustrated in FIG. 11A. Since the second airflow forming device has such a structure, the airflow forming member is not projected through the first airflow passage, and therefore the first airflow is prevented from being turbulent. When the first airflow is turbulent, the ejected droplets tend to adhere to the walls of the particulate material production apparatus, thereby contaminating the walls. In addition, turbulent first airflow often causes uniting of the ejected droplets.

The second airflow supplied from the gas spraying slit 103 is curved by the curved surface of the side wall to form an airflow 102 having a traveling direction perpendicular to the droplet ejection direction. The flight direction of the droplets can be changed by the second airflow 102 supplied from the gas spraying slit 103 right after the droplets are ejected. In addition, the first airflow 101 gradually scatters the droplets 21 while changing the flight directions of the droplets, thereby increasing the distance between the droplets, resulting in reduction of probability of uniting of the droplets.

There is another example of the second airflow forming device, which is illustrated in FIG. 12. In this second airflow forming device, an airflow forming member 108-4 is arranged in the vicinity of the droplet ejecting device with a gap therebetween. The end surface of a side wall (end wall) of the droplet ejecting head is slanting, and the slit is a gap 103 formed between the slanting tip surface of the side wall of the droplet ejecting head 105 and the airflow forming member 108-4. In this regard, the end surface of the airflow forming member 108-4 and the droplet ejection surface of the droplet ejecting head 105 are preferably located on the same plane. In this second airflow forming device, a second airflow is supplied from the slit, which is formed along the end surface of the droplet ejecting device, in a direction substantially perpendicular to the droplet ejection direction, thereby changing the flight direction of the droplets right after the droplets are ejected. In addition, by arranging this slit on an upstream side from the ejection nozzles relative to the flowing direction of the first airflow 101, the droplets 21 are gradually scattered while the flight directions thereof are changed, thereby increasing the distance between the droplets, resulting in reduction of probability of uniting of the droplets. Further, by setting the airflow forming member in such a manner that the end surface of the airflow forming member 108-4 and the droplet ejection surface of the droplet ejecting head 105 are located on the same plane, the airflow forming member is not projected through the first airflow passage, and therefore the first airflow is prevented from being turbulent.

Next, the drying and collecting unit will be described.

The drying and collecting unit 60 (illustrated in FIG. 1) dries droplets of the toner composition liquid ejected to a space (such as air space) by the droplet ejecting device mentioned above, and then collects the dried particles of the toner composition as a toner.

Referring to FIG. 1, the drying and collecting unit 60 includes the chamber 61, a toner collecting portion (solidified particle collecting device) 62, a toner storage (solid particle storage) 63, and an airflow exit 65. In the chamber 61, the first airflow 101 is supplied by a carrier airflow generating device 7 such as blowers (e.g., roots blowers and fixed delivery blowers), and the droplets of the toner composition liquid, which have a liquid state right after the droplets are ejected, are dried (solidified) due to gradual evaporation of the volatile solvent included in the toner composition liquid (or cooling of the melted toner composition), resulting in change of the droplets from a liquid to a solid.

The drying and collecting unit 60 serves as a droplet solidifying device. Although the droplet solidifying device changes depending on the property of the toner composition liquid, the droplet solidifying device is not particularly limited as long as the device can solidify droplets of the toner composition liquid 14. For example, when the toner composition liquid 14 is a liquid in which solid raw materials are dissolved or dispersed in a volatile solvent, droplets are dried in the first airflow right after the droplets are ejected, namely the solvent in the droplets is evaporated. When a solvent is evaporated, factors such as the temperature and the vapor pressure of the first airflow, and choice of the gas used are preferably optimized to control the drying state of the droplets. In this regard, even when the droplets are not sufficiently dried, the droplets can be subjected to an additional drying treatment (secondary drying) after collected if the collected particles are in substantially a dry state.

The solidified toner particles are collected by the toner collecting portion (solidified particle collecting device) 62, and are stored in the toner storage (solid particle storage) 63. Known powder collecting devices such as cyclone collectors and bag filters can be used for the solidified particle collecting device 62, to collect solidified particles from air.

Next, secondary drying will be described.

When a large amount of solvent remains in the toner particles collected by the drying and collecting unit 60, the toner particles are subjected to secondary drying using a secondary drying device (not shown), if desired, to decrease the amount of the residual solvent. Known popular drying devices such as fluidized bed driers and vacuum driers can be used as the secondary drier. When an organic solvent remains in a toner, not only the properties of the toner such as high temperature preservability, fixability and charging property vary with time, but also a problem in that the organic solvent evaporates by heat in a fixing process, thereby adversely affecting the users and the peripherals is caused with a high probability. Therefore, such a toner should be sufficiently dried.

Next, toner, which is an example of the particulate material in the present invention, will be described.

The toner for use in the present invention includes at least a resin, a colorant and a wax, and optionally includes a charge controlling agent, an additive, and other components.

The toner composition liquid serving as a particulate material composition liquid for use in the present invention will be described. The toner composition liquid is a liquid in which the above-mentioned toner components are dissolved or dispersed in a solvent. The toner composition liquid does not necessarily include a solvent as long as the toner composition liquid is in a liquid state when ejected. For example, a toner composition in which the toner components are mixed while part or all of the toner components are melted and which is in a liquid state can also be used as the toner composition liquid.

Any known materials for use in conventional electrophotographic toner can be used for the toner components as long as the toner composition liquid mentioned above can be prepared using the materials. By ejecting such a toner composition liquid from the droplet ejecting device, and collecting the solidified particles using the solidified particle collecting device, a targeted toner can be prepared.

Next, the resin for use in the toner will be described.

At least a binder resin is used as the resin. The binder resin is not particularly limited, and any known resins, which are generally used for toner, can be used while properly selected. Specific examples of the resins include vinyl polymers of monomers such as styrene-based monomers, acrylic-based monomers and methacrylic-based monomers, copolymers of two or more of these monomers, polyester polymers, polyol resins, phenolic resins, silicone resins, polyurethane resins, polyamide resins, furan resins, epoxy resins, xylene resins, terpene resins, coumarone-indene resins, polycarbonate resins, and petroleum resins.

It is preferable that the resin to be included in the toner composition liquid can be dissolved in a solvent and has known properties of a binder resin of toner.

The binder resin for use in the toner preferably has a molecular weight distribution measured by GPC (gel permeation chromatography) such that at least one peak is present in a molecular weight region of from 3,000 to 50,000 from the viewpoints of fixability and offset resistance of the resultant toner. In addition, it is preferable for the binder resin that THF (tetrahydrofuran)-soluble components, which are included in the binder resin, include components having molecular weights of not greater than 100,000 in an amount of from 60 to 100% by weight. It is more preferable for the binder resin to have a molecular weight distribution such that at least one peak is present in a molecular weight region of from 5,000 to 20,000.

The binder resin preferably includes a resin having an acid value of from 0.1 to 50 mgKOH/g in an amount of not less than 60% by weight. In this application, the acid value of a binder resin component to be included in the toner composition is measured with the method described in JIS K-0070.

The toner for use in the present invention can include a magnetic material. Any known magnetic materials for use in conventional electrophotographic toner can be used as the magnetic material. Specific examples thereof include (1) magnetic iron oxides such as magnetite, maghemite and ferrite, and iron oxides including another metal oxide; (2) metals such as iron, cobalt and nickel, and alloys of these metals with another metal such as aluminum, copper, lead, magnesium, tin, zinc, antimony, beryllium, bismuth, cadmium, calcium, manganese, selenium, titanium, tungsten and vanadium; and (3) mixtures of these materials. These magnetic materials can be used as colorants. The added amount of the above-mentioned magnetic materials is from 10 to 200 parts by weight, and more preferably from 20 to 150 parts by weight, based on 100 parts by weight of the binder resin included in the toner. The magnetic material to be included in the toner preferably has a number average particle diameter of from 0.1 μm to 2 μm, and more preferably from 0.1 μm to 0.5 μm. The number average particle diameter is determined by measuring particle diameters of toner particles in a photograph, which is taken by a transmission electron microscope, using a digitizer or the like.

The colorant included in the toner is not particularly limited, and any known colorants, which are generally used for toner, can be used while properly selected.

The added amount of a colorant in the toner is preferably from 1% to 15% by weight, and more preferably from 3% to 10% by weight, based on the weight of the toner.

A master batch which is a combination of a colorant and a resin can be used as the colorant of the toner. The master batch is a material such that a pigment is preliminarily dispersed in a resin. If a pigment can be dispersed in a toner composition, such a master batch is not necessarily used. The master batch is typically prepared by applying a high shearing force to a mixture of a pigment and a resin to satisfactorily disperse the pigment in the resin. One or more of any known resins can be used as the resin used for forming the master batch or the resin to be kneaded together with a master batch.

The added amount of a master batch in the toner is preferably from 0.1 to 20 parts by weight based on 100 parts by weight of the binder resin included in the toner.

In order to satisfactorily disperse a colorant in a binder resin in a master batch production process, a dispersant can be used. It is preferable for such a dispersant to have good compatibility with the binder resin used to satisfactorily disperse a colorant. Any known dispersants can be used. Specific examples of marketed products of such a dispersant include AJISPER PB821 and AJISPER PB822, which are from Ajinomoto Fine-Techno Co., Ltd.; DISPERBYK 2001 from BYK Chemie GmbH; and EFKA 4010 from BASF.

The added amount of a dispersant is preferably from 1 to 200 parts by weight, and more preferably from 5 to 80 parts by weight, based on 100 parts by weight of the colorant included in the master batch. When the added mount is less than 1 part by weight, a problem in that a colorant is not satisfactorily dispersed is often caused. When the added amount is greater than 200 parts by weight, a problem in that the charge property of the toner deteriorates is often caused.

Next, the wax to be included in the toner will be described.

As mentioned above, the toner for use in the present invention includes a wax together with a binder resin and a colorant.

The wax is not particularly limited, and any known waxes can be used for the wax of the toner while properly selected. Specific examples thereof include aliphatic hydrocarbon waxes such as low molecular weight polyethylene, low molecular weight polypropylene, polyolefin waxes, microcrystalline waxes, paraffin waxes, and Sasol waxes; oxidized materials of aliphatic hydrocarbon waxes or block copolymers of the materials such as oxidized polyethylene waxes; vegetable waxes such as candelilla waxes, carnauba waxes, Japan waxes, and jojoba waxes; animal waxes such as bees waxes, lanolin and whale waxes; mineral waxes such as ozocerite, ceresine and petrolatum; waxes including fatty acid esters as main components such as montanic acid ester waxes, and caster waxes; and partially or entirely deoxidized fatty acid esters such as deoxidized carnauba waxes.

The wax to be included in the toner preferably has a melting point of form 70 to 140° C., and more preferably from 70 to 120° C., so that the fixability of the toner and the offset resistance thereof are balanced. When the melting point is not lower than 70° C., good blocking resistance can be imparted to the toner. When the melting point is not higher than 140° C., good offset resistance can be imparted to the toner.

The total amount of waxes in the toner is preferably from 0.2 to 20 parts by weight, and more preferably from 0.5 to 10 parts by weight, based on 100 parts by weight of the binder resin included in the toner.

The melting point of a wax is defined as the temperature at which the maximum endothermic peak of the DSC (differential scanning calorimetry) curve of the wax has a peak top.

The DSC measuring instrument used for measuring the melting point of a wax or a toner is preferably a high-precision internally-heated input compensation type differential scanning calorimeter. ASTM D3418-82 is used as the measuring method. The DSC curve used for determining the melting point is obtained by heating a sample at a temperature rising speed of 10° C./min after the sample is preliminarily heated and then cooled to delete history from the sample.

In order to protect the electrostatic latent image bearing member and carrier used, to enhance the cleaning property and the fixing rate of the toner, and to adjust the thermal property, the electric property, the physical property, the resistance, and the softening point of the toner, other additives can be added to the toner if desired. Specific examples thereof include various metal soaps, fluorine-containing surfactants, dioctyl phthalate, electroconductivity imparting agents such as tin oxide, zinc oxide, carbon black and antimony oxide, and particulate inorganic materials such as titanium oxide, aluminum oxide, and alumina. The particulate inorganic materials may be hydrophobized if desired. In addition, lubricants such as polytetrafluoroethylene, zinc stearate and polyvinylidene fluoride, abrasives such as cesium oxide, silicon carbide and strontium titanate, and caking preventing agents can also be added in a small amount. Further, small amounts of white particulate materials and black particulate materials, which have a charge having a polarity opposite to that of the toner, can be used as development improving agents.

It is also preferable that the surfaces of these additives are treated with one or more of treatment agents such as silicone varnishes, various modified silicone varnishes, silicone oils, various modified silicone oils, silane coupling agents, silane coupling agents having a functional group, and other organic silicon compounds to control the charge quantity of the toner.

Particulate inorganic materials are preferably used as the additives (i.e., external additives). Specific examples thereof include known particulate inorganic materials such as silica, alumina and titanium oxide.

In addition, particulate polymers (such as polystyrene, copolymers of methacrylates, and copolymers of acrylates), which are prepared by soap free emulsion polymerization methods, suspension polymerization methods, and dispersion polymerization methods; particulate polycondensation polymers such as silicone resins, benzoguanamine resins, and nylons; and particulate thermosetting resins, can be used as the external additives.

These external additives can be treated with a surface treatment agent to enhance the hydrophobicity thereof, thereby preventing deterioration of the additives themselves under high humidity conditions. Specific examples of such a surface treatment agent include silane coupling agents, silylating agents, silane coupling agents having a fluorinated alkyl group, organic titanate coupling agents, aluminum coupling agents, silicone oils, and modified silicone oils.

The external additives preferably have a primary particle diameter of form 5 nm to 2 µm, and more preferably from 5 nm to 500 nm. The BET specific surface area thereof is preferably from 20 to 500 m²/g. The added amount of such a particulate inorganic material is preferably from 0.01 to 5% by weight, and more preferably from 0.01 to 2.0% by weight, based on the weight of the toner.

Specific examples of the cleanability improving agent, which is added to the toner to easily remove toner particles remaining on an electrostatic latent image bearing member and a primary transfer medium even after the toner image thereon is transferred, include fatty acids and metal salts of fatty acids such as zinc stearate, calcium stearate, and stearic acid; and particulate polymers, which are prepared by soap free emulsion polymerization methods, such as particulate polymethyl methacrylate, and particulate polystyrene. The particulate polymers preferably have a relatively narrow particle diameter distribution, and a volume average particle diameter of from 0.01 µm to 1 µm.

The particulate material production method of the present invention includes a droplet ejection step of ejecting a particulate material composition liquid or a melted particulate material composition to form droplets thereof; a droplet solidifying step of solidifying the ejected droplets to form a particulate material; and a feeding step of feeding the ejected droplets with a first airflow. The method further includes a step of applying a second airflow to the droplets right after the droplets are ejected. In the second airflow applying step, a pressed gas is supplied from a slit to form the second airflow. The first airflow is applied in a direction substantially perpendicular to the droplet ejection direction.

This particulate material production method is satisfactorily performed by using the above-mentioned particulate material production apparatus of the present invention.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Initially, the toner composition liquid (solution or dispersion) used for Examples and Comparative Examples will be described.

Preparation of Colorant Dispersion

Initially, a carbon black dispersion, which serves as a colorant, was prepared.

Specifically, 17 parts by weight of a carbon black (REGAL 400 from Cabot Corporation), and 3 parts by weight of a pigment dispersant were dispersed in 80 parts by weight of ethyl acetate using a mixer having an agitation blade to prepare a primary pigment dispersion. In this regard, AJISPER PB821 (from Ajinomoto Fine-Techno Co., Ltd.), which is a copolymer having a basic functional group, was used as the pigment dispersant. Next, a strong shear force was applied to the thus prepared primary pigment dispersion using a bead mill (Type LMZ from Ashizawa Finetech Ltd. using zirconia beads having a particle diameter of 0.3 mm) to finely disperse the carbon black, thereby preparing a secondary dispersion, from which aggregates with a size of not less than 5 µm were removed.

Preparation of Wax Dispersion

Next, a wax dispersion was prepared.

Specifically, 18 parts by weight of a carnauba wax, and 2 parts by weight of a wax dispersant were dispersed in 80 parts by weight of ethyl acetate using a mixer having an agitation blade to prepare a primary wax dispersion. After the primary wax dispersion was heated to 80° C. while agitated to dissolve the carnauba wax, the wax solution was cooled to room temperature so that particles of the carnauba wax having a maximum particle diameter of not greater than 3 μm were precipitated. In this regard, a polyethylene wax grafted with a styrene-butyl acrylate copolymer was used as the wax dispersant. Next, a strong shear force was applied to the thus prepared primary wax dispersion using a bead mill (Type LMZ from Ashizawa Finetech Ltd. using zirconia beads having a particle diameter of 0.3 mm) to finely disperse the carnauba wax, thereby preparing a secondary wax dispersion having a maximum particle diameter of not greater than 1 μm.

Preparation of Toner Composition Liquid

Next, a toner composition liquid, which includes a resin serving as a binder resin, the above-prepared colorant dispersion, and the above-prepared wax dispersion and which has the following formula, was prepared.

Specifically, 100 parts by weight of a polyester resin serving as a binder resin, 30 parts by weight of the above-prepared colorant dispersion, and 30 parts by weight of the above-prepared wax dispersion were added to 840 parts by weight of ethyl acetate, and the mixture was agitated for 10 minutes using a mixer having an agitation blade to prepare a uniform dispersion. In this regard, agglomeration of the pigment and the wax due to shock in dilution of the pigment dispersion and the wax dispersion by the solvent was not caused.

Toner Production Apparatus

A particulate material production apparatus 1 having such a structure as illustrated in FIG. 1 was used to prepare a toner. The size and conditions of the devices of the particulate material production apparatus are the following.

Droplet Ejecting Unit

The liquid column resonance droplet ejecting device 11 illustrated in FIG. 2 was used as the droplet ejecting device 2. In this regard, a liquid column resonance droplet ejecting device having a structure such that the length L between both the ends of the liquid column resonance chamber 18 in the longitudinal direction thereof is 1.85 mm, an N=2 resonance mode is used, and the first to fourth ejection nozzles 19 are located in a region in which the N=2 mode pressure standing wave has an antinode was used. In addition, the size of openings of the ejection nozzles 19 was 10.0 μm, and nozzles having such a round cross-section as illustrated in FIG. 4A were used. Further, a function generator WF1973 from NF Corporation was used as a drive signal generator, and was connected with a vibration generating device 20 using a lead wire covered with polyethylene. In this regard, the drive frequency was 330 kHz so as to be matched with the liquid column resonance frequency, and the input signal was the peak value (12.0V) of the sine wave of the applied voltage.

The droplets ejected under the conditions mentioned above were photographed with a CCD (charge coupled device) camera to measure the ejection speed of the droplets. As a result, the ejection speed was 14 m/s.

In this regard, a droplet ejecting device having a structure such that 192 dual-row chambers, each of which has first to fourth nozzles, are arranged in the longitudinal direction namely, the number of the chambers is 384, and the total number of the ejection nozzles 19 is 1536 (384×4) was used.

Uniting Preventing Device

A second airflow forming device having such a structure as illustrated in FIG. 8 was used as the uniting preventing device, and a second airflow was applied to droplets right after the droplets were ejected from the droplet ejecting device to prepare a toner. In the second airflow forming device, a compressor and a pressure adjuster were provided to press a gas (air) so that the pressed gas has a pressure of 0.1 MPa, and the speed of the combined second airflow 102 flowing in the droplet ejection direction was adjusted so as to be 30 m/s using a flow adjuster.

In the second airflow forming device having such a structure as illustrated in FIG. 8, opposed airflows were supplied from both the sides of the droplet ejection surface through slits as illustrated in FIG. 8B, and the airflows change the direction to form the combined second airflow 102, thereby accelerating the ejected droplets, resulting in prevention of uniting of the droplets. In this regard, the gap of the slits was 0.1 mm, and the width of the slits was 70 mm.

Drying and Collecting Unit

The chamber 61 of the drying and collecting unit, which has a cylindrical shape such that the inner diameter thereof is 300 mm, the height thereof is 2000 mm, and the upper and lower ends thereof are narrowed, was vertically set fixedly. The droplets ejecting device 2 and a passage through which the first airflow 101 flows were provided on the upper end portion of the chamber 61. A cyclone collector serving as the toner collecting portion 62 was connected with the lower end of the chamber 61. The passage of the first airflow 101 has a rectangle cross-section with a size of 80 mm in width and 30 mm in height, and a length of 200 mm. The droplet ejecting device 2 was laterally set at a location of the first airflow passage, which is 50 mm apart from an entrance 64 of the passage from which the first airflow is supplied. In this regard, the droplet ejection direction was perpendicular to the first airflow direction, and the speed of the first airflow was adjusted so as to be 20 m/s.

Particle Diameter Measurement

The particle diameter was measured with a flow particle image analyzer. The measuring method is the following. Specifically, the method for measuring the particle diameter of a toner, toner particles and an external additive of toner using a flow particle image analyzer can be performed, for example, by using a flow particle image analyzer, FPIA-3000 from Sysmex Corporation.

In the measuring method, initially, a few drops of a non-ionic surfactant (preferably CONTAMINON N from Wako Pure Chemical Industries, Ltd.) are added to 10 ml of water, from which dusts have been removed such that not greater than 20 particles having particle diameters in the measuring range (for example, circle equivalent diameter of not less than 0.60 μm and less than 159.21 μm) are included in the water with a volume of $10^{-3}$ cm$^3$. In addition, 5 mg of a sample is added thereto, and the mixture is subjected to a dispersing treatment for 1 minute using a supersonic dispersing machine UH-50 from SMT Corporation, which is operated under conditions of 20 kHz in frequency and 50 W/10 cm$^3$ in power. Further, the mixture is subjected to the dispersing treatment for 5 minutes in total to prepare a dispersion of the sample which includes 4,000 to 8,000 particles of the sample per $10^{-3}$ cm$^3$ (particles having particle diameters in the circle equivalent diameter range mentioned above are targeted). Thus, the particle diameter distribution of the particles of the sample in the circle equivalent diameter range of not less than 0.60 μm and less than 159.21 μm is measured using the dispersion.

The sample dispersion is passed through a flat transparent flow cell (i.e., a flow passage, which has a thickness of about 200 μm and which broadens in the flow direction). A strobe and a CCD camera are set so as to be opposed with the flow cell therebetween to form a light path which passes through the flow cell in the thickness direction thereof. When the sample dispersion flows in the flow cell, the strobe is flashed at regular intervals of 1/30 sec to obtain images of the flowing particles. As a result, two-dimensional images in a predetermined area parallel to the flow cell are obtained. The circle equivalent particle diameters of the photographed particles, which mean the diameters of circles having the same areas as the photographed particles, are calculated based on the areas of particles in the thus obtained two-dimensional images.

The flow particle image analyzer can measure the circle equivalent particle diameters of not less than 1,200 particles per about 1 minute, and can determine the number and percentage (% by number) of particles in a predetermined range of circle equivalent diameter. The results (frequency percentage and cumulative percentage) can be output in such a manner that the particle diameter range of from 0.06 μm to 400 μm is divided into 226 channels (i.e., 30 channels in one octabe). In reality, the particle diameter measurement is performed in the circle equivalent particle diameter range of not less than 0.60 μm and less than 159.21 μm.

The particle diameter distribution of particles is represented by a ratio (Dv/Dn) of the volume average particle diameter (Dv) of the particles to the number average particle diameter (Dn) of the particles. When the ratio Dv/Dn is 1, which is the minimum value of the ratio, all the particles have the same particle diameter. As the ratio Dv/Dn increases, the particle diameter distribution broadens. The ratio Dv/Dn of toners prepared by popular pulverization methods is from 1.15 to 1.25, and the ratio Dv/Dn of toners prepared by popular polymerization methods is from 1.10 to 1.15. It was confirmed that when the ratio Dv/Dn of a toner prepared by the particulate material production apparatus of the present invention is not greater than 1.15, the toner can produce a good image quality improving effect. The ratio Dv/Dn of the toner is more preferably not greater than 1.10.

In electrophotography, it is preferable for the developing process, the transfer process and the fixing process that the particle diameter distribution of the toner used is narrow, namely, toner having a broad particle diameter distribution is not preferable. In order to stably produce high-definition images, the ratio Dv/Dn of the toner used is preferably not greater than 1.15. In order to produce higher-definition images, the ratio Dv/Dn of the toner is preferably not greater than 1.10.

Example 1

The above-prepared toner composition liquid was ejected from the droplet ejecting device 2 of the toner production apparatus 1 having such a structure as illustrated in FIG. 1. The ejected droplets were dried and solidified in the chamber 61, and the solidified toner particles were collected by a cyclone collector serving as the solidified particle collecting device 62. Thus, toner particles were prepared. In this regard, a roots blower and a fixed delivery blower were used as the first airflow forming device, and a compressor was used for supplying a pressed gas (air) to the second airflow forming device.

The particle diameter distribution of the toner was measured under the above-mentioned conditions using the flow particle image analyzer (FPIA-3000 from Sysmex Corporation). This measurement was repeated three times. As a result, the average values of the volume average particle diameter (Dv), the number average particle diameter (Dn), and the ratio Dv/Dn were 5.8 μm, 5.3 μm, and 1.09, respectively.

Example 2

The procedure for preparation of the toner in Example 1 was repeated except that the gap of the slit of the airflow forming member was changed to 1 mm. In this regard, the speed of the second airflow in the droplet ejection direction was adjusted so as to be 30 m/s.

Similarly to the operations performed in Example 1, the toner composition liquid was ejected, and the produced toner particles were collected.

The particle diameter distribution of the toner was measured by the method mentioned above in Example 1. As a result, the average values of the volume average particle diameter (Dv), the number average particle diameter (Dn), and the ratio Dv/Dn were 5.6 μm, 5.3 μm, and 1.06, respectively.

Example 3

The procedure for preparation of the toner in Example 1 was repeated except that the gap of the slit of the airflow forming member was changed to 2 mm. In this regard, the speed of the second airflow in the droplet ejection direction was adjusted so as to be 30 m/s.

Similarly to the operations performed in Example 1, the toner composition liquid was ejected, and the produced toner particles were collected.

The particle diameter distribution of the toner was measured by the method mentioned above in Example 1. As a result, the average values of the volume average particle diameter (Dv), the number average particle diameter (Dn), and the ratio Dv/Dn were 5.5 μm, 5.3 μm, and 1.04, respectively.

Example 4

The procedure for preparation of the toner in Example 1 was repeated except that the gap of the slit of the airflow forming member was changed to 3 mm. In this regard, the speed of the second airflow in the droplet ejection direction was adjusted so as to be 30 m/s.

Similarly to the operations performed in Example 1, the toner composition liquid was ejected, and the produced toner particles were collected.

The particle diameter distribution of the toner was measured by the method mentioned above in Example 1. As a result, the average values of the volume average particle diameter (Dv), the number average particle diameter (Dn), and the ratio Dv/Dn were 5.8 μm, 5.3 μm, and 1.09, respectively.

Example 5

A toner was prepared by using a second airflow forming device having such a structure as illustrated in FIG. 9 for the particulate material production apparatus 1 used in Example 1. In the second airflow forming device illustrated in FIG. 9, an airflow was supplied from each of the slits located on both the ends at the longer sides of the ejection surface, on which the ejection nozzles are arranged, as illustrated in FIG. 9B, and the traveling directions of the airflows were changed at the curved portions of the droplet ejecting head by the Coanda effect, thereby forming second airflows having travelling directions substantially perpendicular to the droplet ejection direction. Since the second airflows were supplied from two opposed directions, the airflows collide with each other, thereby forming a combined second airflow having a travelling direction parallel to the droplet ejection direction.

In the second airflow forming device, the gap of each slit formed between the airflow forming member and the side wall of the droplet ejecting head was 0.1 mm, the width of each slit was 70 mm, the radius of the curved portion was 5 mm, and the speed of the second airflows in the vicinity of the droplet ejection surface having the ejection nozzles was controlled so as to be 30 m/s.

In addition, similarly to the operations performed in Example 1, the toner composition liquid was ejected, and the produced toner particles were collected.

The particle diameter distribution of the toner was measured by the method mentioned above in Example 1. As a result, the average values of the volume average particle diameter (Dv), the number average particle diameter (Dn), and the ratio Dv/Dn were 5.6 μm, 5.2 μm, and 1.08, respectively.

Example 6

A toner was prepared by using a second airflow forming device having such a structure as illustrated in FIG. 10 for the particulate material production apparatus 1 used in Example 1. In the second airflow forming device illustrated in FIG. 10, an airflow was supplied from the slit in the same direction as the traveling direction of the first airflow, and the flight direction of the droplets was changed right after the droplets were ejected to prevent uniting of the droplets.

In the second airflow forming device, the gap of the slit of the airflow forming member was 0.1 mm, the width of the slit was 70 mm, and the speed of the second airflow in the vicinity of the droplet ejection surface having the ejection nozzles was controlled so as to be 30 m/s.

In addition, similarly to the operations performed in Example 1, the toner composition liquid was ejected, and the produced toner particles were collected.

The particle diameter distribution of the toner was measured by the method mentioned above in Example 1. As a result, the average values of the volume average particle diameter (Dv), the number average particle diameter (Dn), and the ratio Dv/Dn were 5.6 μm, 5.3 μm, and 1.06, respectively.

Example 7

A toner was prepared by using a second airflow forming device having such a structure as illustrated in FIG. 11 for the particulate material production apparatus 1 used in Example 1. In the second airflow forming device illustrated in FIG. 11, an airflow fed from the slit was supplied along the curved portion to form a second airflow having the same travelling direction as the travelling direction of the first airflow using Coanda effect, and therefore the flight direction of the droplets was changed right after the droplets were ejected to prevent uniting of the droplets.

In the second airflow forming device, the gap of the slit of the airflow forming member was 0.1 mm, the width of the slit was 70 mm, the radius of the curved portion was 5 mm, and the speed of the airflow in the vicinity of the ejection surface having the ejection nozzles was controlled so as to be 30 m/s.

In addition, similarly to the operations performed in Example 1, the toner composition liquid was ejected, and the produced toner particles were collected.

The particle diameter distribution of the toner was measured by the method mentioned above in Example 1. As a result, the average values of the volume average particle diameter (Dv), the number average particle diameter (Dn), and the ratio Dv/Dn were 5.5 μm, 5.3 μm, and 1.04, respectively.

Comparative Example 1

The procedure for preparation of the toner in Example 1 was repeated except that the second airflows were not supplied from the second airflow forming device.

The particle diameter distribution of the toner was measured by the method mentioned above in Example 1. As a result, the average values of the volume average particle diameter (Dv), the number average particle diameter (Dn), and the ratio Dv/Dn were 6.2 μm, 5.4 μm, and 1.15, respectively. It is considered that the ejected droplets were decelerated due to fluid resistance, and thereby some of the droplets were united, resulting in broadening of the particle diameter distribution of the toner.

Comparative Example 2

Figure 13:
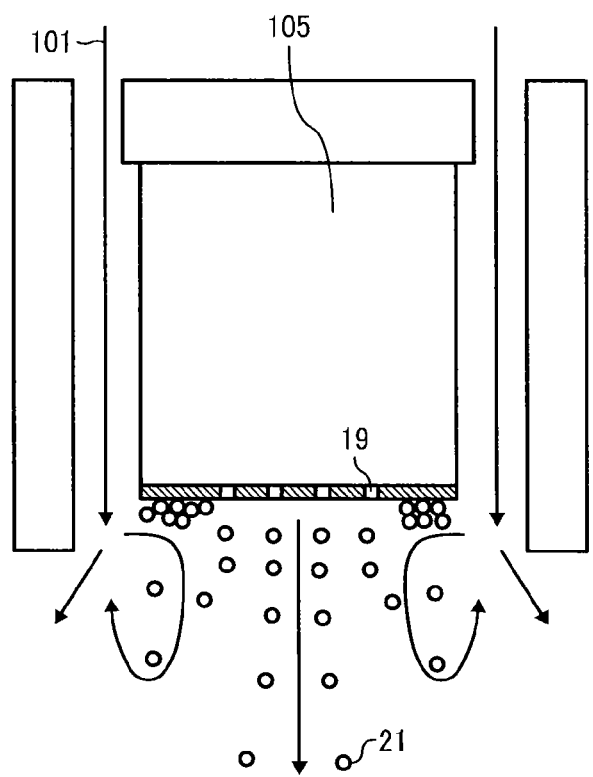
FIG. 13 is a schematic view illustrating a conventional airflow forming device used for Comparative Example 2.

The droplet ejecting device, which is disclosed in JP-2008-286947-A and which is illustrated in FIG. 13, was used for the particulate material production apparatus 1. In the droplet ejecting device illustrated in FIG. 13, a first airflow 101 having a traveling direction parallel to the droplet ejection direction is formed, and the droplet ejecting head 105 is set so as to eject droplets downward. The procedure for preparation of the toner in Example 1 was repeated except that the airflow forming device was used.

The particle diameter distribution of the toner was measured by the method mentioned above in Example 1. As a result, the average values of the volume average particle diameter (Dv), the number average particle diameter (Dn), and the ratio Dv/Dn were 6.6 μm, 5.4 μm, and 1.22, respectively.

It is considered that since the airflow was not sufficiently supplied to the droplets right after the droplets are ejected, some of the droplets were united, thereby broadening the particle diameter distribution of the toner.

The results are summarized in Table 1 below.

TABLE 1

|  | Dv (μm) | Dn (μm) | Dv/Dn |
|---|---|---|---|
| Example 1 | 5.8 | 5.3 | 1.09 |
| Example 2 | 5.6 | 5.3 | 1.06 |
| Example 3 | 5.5 | 5.3 | 1.04 |
| Example 4 | 5.8 | 5.3 | 1.09 |
| Example 5 | 5.6 | 5.2 | 1.08 |
| Example 6 | 5.6 | 5.3 | 1.06 |
| Example 7 | 5.5 | 5.3 | 1.04 |
| Comparative Example 1 | 6.2 | 5.4 | 1.15 |
| Comparative Example 2 | 6.6 | 5.4 | 1.22 |

As mentioned above, according to the particulate material production method (the toner production method) and the particulate material production apparatus (the toner production apparatus) of the present invention, each of which uses an ejection granulation method, an airflow can be effectively applied to droplets right after the droplets are ejected, thereby preventing uniting of the droplets, resulting in formation of a particulate material having a sharp particle diameter distribution.

EFFECT OF THE PRESENT INVENTION

According to the particulate material production method and the particulate material production apparatus of the present invention, each of which uses an ejection granulation method, deterioration of the particle diameter distribution can be prevented, and thereby a particulate material (such as toner) having an extremely sharp particle diameter distribution, which is hardly produced by conventional particulate material production methods, can be produced.

Additional modifications and variations of the present invention are possible in light of the above teachings. It is therefore to be understood that within the scope of the appended claims the invention may be practiced other than as specifically described herein.

What is claimed is:

1. A particulate material production apparatus comprising:
a droplet ejector to eject droplets of a particulate material composition liquid or a melted particulate material composition in a droplet ejection direction from nozzles located on a droplet ejection surface of the droplet ejector;
wherein the droplet ejector comprises:
a common liquid passage in fluid communication with a liquid column resonance chamber to contain the particulate material composition liquid or the melted particulate material composition, wherein the liquid column resonance chamber comprises first and second opposed longitudinal end walls spaced apart at a distance of L, and a width W, wherein W<½L, wherein the second longitudinal end wall is closer to the common liquid passage, wherein a ratio Le/L of a length Le between the second longitudinal end wall closer and the nozzle closest to the second longitudinal end wall and the distance L is greater than 0.6;
a solidifying device to solidify the droplets ejected by the droplet ejector;
a first airflow forming device to form a first airflow to feed the droplets ejected by the droplet ejector to the solidifying device with the first airflow, wherein a traveling direction of the first airflow is substantially perpendicular to the droplet ejection direction; and
a second airflow forming device to form a second airflow to apply the second airflow to the droplets before the droplets are fed by the first airflow, wherein the second airflow forming device forms the second airflow by supplying a pressed gas from a slit.

2. The particulate material production apparatus according to claim 1, wherein a traveling direction of the second airflow is substantially perpendicular to the ejection direction of the droplets.

3. The particulate material production apparatus according to claim 1, wherein the ejection direction of the droplets is a lateral direction, and the traveling direction of the first airflow is a vertical downward direction.

4. The particulate material production apparatus according to claim 1, wherein the second airflow forming device includes:
an airflow forming member located adjacent to the droplet ejector to form the slit,
wherein the slit is a gap formed between an end surface of a wall of the droplet ejector on a droplet ejection surface side of the droplet ejector and the airflow forming member.

5. The particulate material production apparatus according to claim 4, wherein an end surface of the airflow forming member is tapered so as to be slanting toward an exit of the slit.

6. The particulate material production apparatus according to claim 1, wherein the slit has a gap of not less than 0.05 mm and not greater than 5 mm.

7. The particulate material production apparatus according to claim 1, wherein the second airflow forming device includes:
an airflow forming member located adjacent to the droplet ejector to form the slit, and
wherein an end surface of a wall of the droplet ejector on a droplet ejection surface side of the droplet ejector is slanting relative to the droplet ejection surface, the slit is formed by the slanting end surface of the droplet ejector and the airflow forming member located adjacent to the slanting end surface with a gap therebetween, and an end surface of the airflow forming member and the droplet ejection surface of the droplet ejector are located on substantially a same plane.

8. The particulate material production apparatus according to claim 1, wherein the second airflow forming device includes:
an airflow forming member located adjacent to the droplet ejector to form the slit, and
wherein a surface of a shoulder of a wall of the droplet ejector on a droplet ejection surface side of the droplet ejector is curved, the airflow forming member is located adjacent to the curved surface with a gap therebetween to form the slit, and an end surface of the airflow forming member and the droplet ejection surface of the droplet ejector are located on substantially a same plane.

9. The particulate material production apparatus according to claim 1, wherein the droplet ejector includes:
a vibrator to apply vibration to the particulate material composition liquid or the melted particulate material composition in the liquid column resonance chamber to form a liquid column resonance standing wave, and
wherein the nozzles are located in a region in which the standing wave has an antinode.

10. A particulate material production method comprising:
ejecting droplets of a particulate material composition liquid or a melted particulate material composition from nozzles in a droplet ejection direction using the particulate material production apparatus of claim 1 a particulate material production apparatus, wherein the particulate material production apparatus comprises:
a droplet ejector to eject droplets of a particulate material composition liquid or a melted particulate material composition in a droplet ejection direction from nozzles located on a droplet ejection surface of the droplet ejector;
wherein the droplet ejector comprises:
a common liquid passage in fluid communication with a liquid column resonance chamber to contain the particulate material composition liquid or the melted particulate material composition, wherein the liquid column resonance chamber comprises first and second opposed longitudinal end walls spaced apart at a distance of L, and a width W, wherein W<½L, wherein the second longitudinal end wall is closer to the common liquid passage, wherein a ratio Le/L of a length Le between the second longitudinal end wall closer and the nozzle closest to the second longitudinal end wall and the distance L is greater than 0.6;
a solidifying device to solidify the droplets ejected by the droplet ejector; a first airflow forming device to form a first airflow to feed the droplets ejected by the droplet ejector to the solidifying device with the first airflow, wherein a traveling direction of the first airflow is substantially perpendicular to the droplet ejection direction; and
a second airflow forming device to form a second airflow to apply the second airflow to the droplets before the droplets are fed by the first airflow, wherein the second airflow forming device forms the second airflow by supplying a pressed gas from a slit;

solidifying the ejected droplets to form a particulate material;

feeding the ejected droplets with a first airflow having a traveling direction substantially perpendicular to the droplet ejection direction; and supplying a pressed gas from a slit to apply a second airflow to the ejected droplets before feeding the ejected droplets with the first airflow.

11. The particulate material production apparatus according to claim 1, wherein the second airflow forming device forms the second airflow by supplying a pressed gas from a slit, and wherein the slit is linear, and the nozzles of the droplet ejector are located on a plane parallel to the linear slit.

12. The particular material production apparatus according to claim 1, wherein the second airflow forming device forms the second airflow by supplying a pressed gas from a slit, and wherein the droplet ejector ejects the droplets periodically at a predetermined speed.

* * * * *